United States Patent
Jeong et al.

(10) Patent No.: US 10,742,573 B2
(45) Date of Patent: Aug. 11, 2020

(54) METHOD OF PROVIDING MESSAGE AND USER DEVICE SUPPORTING THE SAME

(71) Applicant: Samsung Electronics Co., Ltd., Suwon-si, Gyeonggi-do (KR)

(72) Inventors: Jinhong Jeong, Yongin-si (KR); Geonsoo Kim, Suwon-si (KR); Hanjib Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 755 days.

(21) Appl. No.: 14/904,550

(22) PCT Filed: Jul. 18, 2014

(86) PCT No.: PCT/KR2014/006546
§ 371 (c)(1),
(2) Date: Jan. 12, 2016

(87) PCT Pub. No.: WO2015/009103
PCT Pub. Date: Jan. 22, 2015

(65) Prior Publication Data
US 2016/0149838 A1 May 26, 2016

(30) Foreign Application Priority Data
Jul. 19, 2013 (KR) .................. 10-2013-0085466

(51) Int. Cl.
*H04L 12/58* (2006.01)
*H04B 1/40* (2015.01)
(Continued)

(52) U.S. Cl.
CPC ............ *H04L 51/04* (2013.01); *G06F 3/0482* (2013.01); *G06F 3/0486* (2013.01);
(Continued)

(58) Field of Classification Search
CPC .... G06F 3/0488; G06F 3/0482; G06F 3/0486; G06F 3/04845; G06F 3/04847;
(Continued)

(56) References Cited

U.S. PATENT DOCUMENTS 6,693,652 B1 * 2/2004 Barrus ............... G06F 3/0481
715/838
7,111,044 B2 * 9/2006 Lee ................... H04L 12/1827
709/204

(Continued)

FOREIGN PATENT DOCUMENTS

CN 1798392 A 7/2006
CN 1848984 A 10/2006
(Continued)

OTHER PUBLICATIONS

Chinese Office Action dated Aug. 3, 2018; Chinese Appln. No. 201480040758.6.
(Continued)

*Primary Examiner* — Andrew L Tank
(74) *Attorney, Agent, or Firm* — Jefferson IP Law, LLP

(57) ABSTRACT

A method of providing a message by a user device and user device supporting the same are provided. The method includes displaying a message with a first attribute through a user device, detecting a user input corresponding to a portion of the message, and providing the portion with a second attribute based on the user input.

11 Claims, 28 Drawing Sheets

(51) Int. Cl.
*H04M 1/725* (2006.01)
*G06Q 10/10* (2012.01)
*G06F 3/0488* (2013.01)
*G06F 3/0482* (2013.01)
*G06F 3/0486* (2013.01)
*G06F 3/0484* (2013.01)
*G06F 3/0487* (2013.01)
*G06F 7/08* (2006.01)

(52) U.S. Cl.
CPC .......... *G06F 3/0487* (2013.01); *G06F 3/0488* (2013.01); *G06F 3/04845* (2013.01); *G06F 3/04847* (2013.01); *G06F 7/08* (2013.01); *G06Q 10/107* (2013.01); *H04B 1/40* (2013.01); *H04L 51/02* (2013.01); *H04M 1/72552* (2013.01); *G06F 2203/04808* (2013.01); *H04M 2250/22* (2013.01)

(58) Field of Classification Search
CPC ............. G06F 3/0487; G06F 7/08; G06F 2203/04808; H04M 1/72552; H04M 2250/22; H04L 51/04; H04L 51/02; H04B 1/40; G06Q 10/107
See application file for complete search history.

(56) References Cited

U.S. PATENT DOCUMENTS

| | | | |
|---|---|---|---|
| 8,020,105 | B1 | 9/2011 | Lemay et al. |
| 8,677,245 | B2 | 3/2014 | Song et al. |
| 8,713,469 | B2 | 4/2014 | Park et al. |
| 9,026,940 | B2 | 5/2015 | Jung et al. |
| 9,059,953 | B2* | 6/2015 | Shmunis ............... G06Q 10/107 |
| 9,128,605 | B2* | 9/2015 | Nan ..................... G06F 3/0486 |
| 2003/0163537 | A1* | 8/2003 | Rohall ................. G06Q 10/107 709/206 |
| 2005/0114781 | A1* | 5/2005 | Brownholtz .......... G06F 3/0482 715/733 |
| 2007/0061738 | A1* | 3/2007 | Taboada ............... G06Q 10/107 715/752 |
| 2007/0214424 | A1 | 9/2007 | Gilead et al. |
| 2009/0132922 | A1 | 5/2009 | Shibuya et al. |
| 2009/0177981 | A1* | 7/2009 | Christie ............. G06F 3/04883 715/758 |
| 2010/0332518 | A1 | 12/2010 | Song et al. |
| 2011/0258559 | A1* | 10/2011 | You ..................... G06Q 10/107 715/752 |
| 2012/0094720 | A1 | 4/2012 | Choi et al. |
| 2012/0185797 | A1* | 7/2012 | Thorsen ................ G06Q 10/00 715/784 |
| 2013/0069969 | A1 | 3/2013 | Chang et al. |
| 2013/0097526 | A1 | 4/2013 | Stovicek et al. |
| 2013/0176338 | A1 | 7/2013 | Park et al. |
| 2013/0179800 | A1 | 7/2013 | Jeong et al. |

FOREIGN PATENT DOCUMENTS

| | | |
|---|---|---|
| CN | 101052182 A | 10/2007 |
| CN | 103139377 A | 6/2013 |
| EP | 2584770 A1 | 4/2013 |
| EP | 2613286 A1 | 7/2013 |
| KR | 10-2008-0022727 A | 3/2008 |
| KR | 10-2008-0096255 A | 10/2008 |
| KR | 10-2009-0116971 A | 11/2009 |
| KR | 10-2011-0000056 A | 1/2011 |
| KR | 10-2012-0003566 A | 1/2012 |
| KR | 10-2012-0006829 A | 1/2012 |
| KR | 10-2012-0039998 A | 4/2012 |
| KR | 10-2012-0076014 A | 7/2012 |
| KR | 10-2013-0080519 A | 7/2013 |
| WO | 2007/104648 A2 | 9/2007 |

OTHER PUBLICATIONS

Chinese Office Action dated Jan. 29, 2019, issued in a counterpart Chinese application No. 201480040758.6.

* cited by examiner

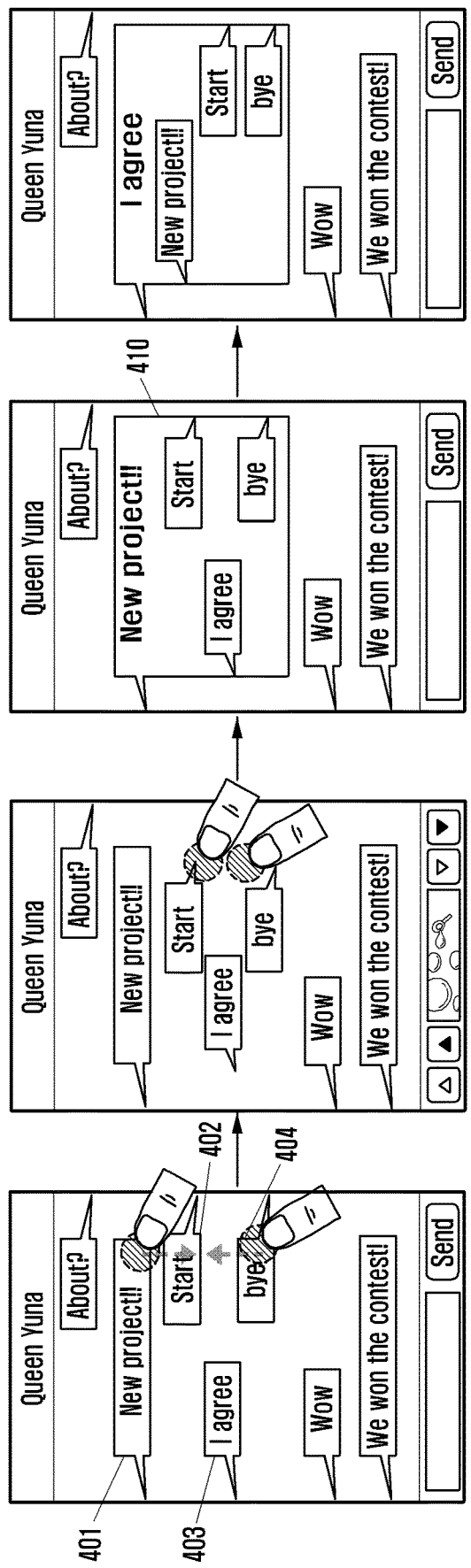

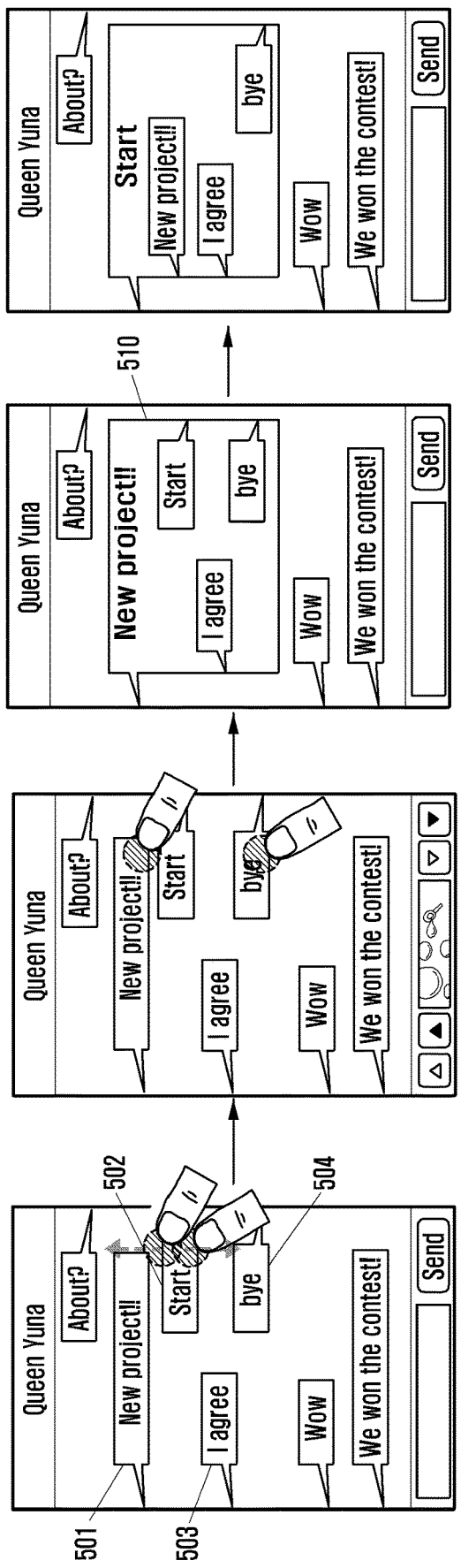

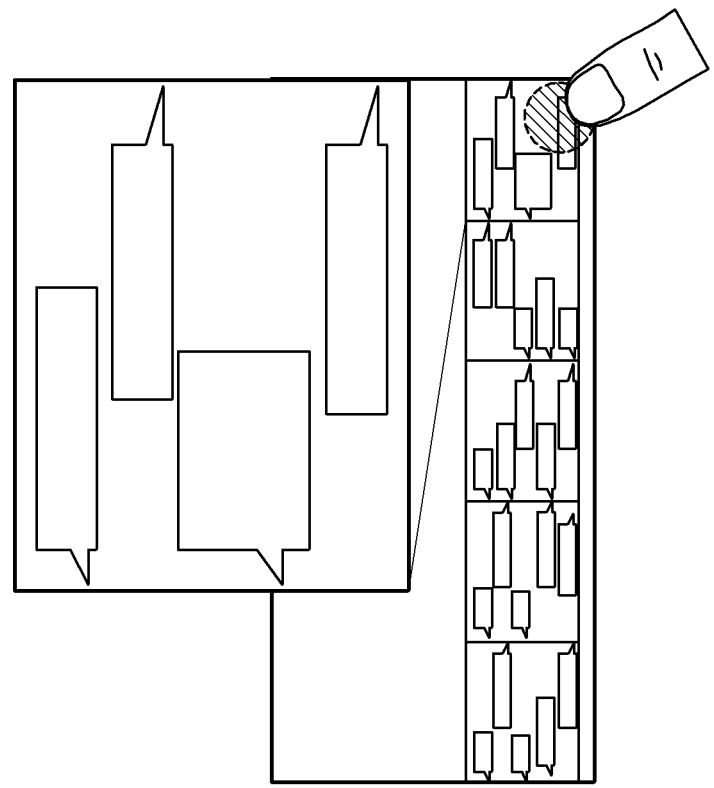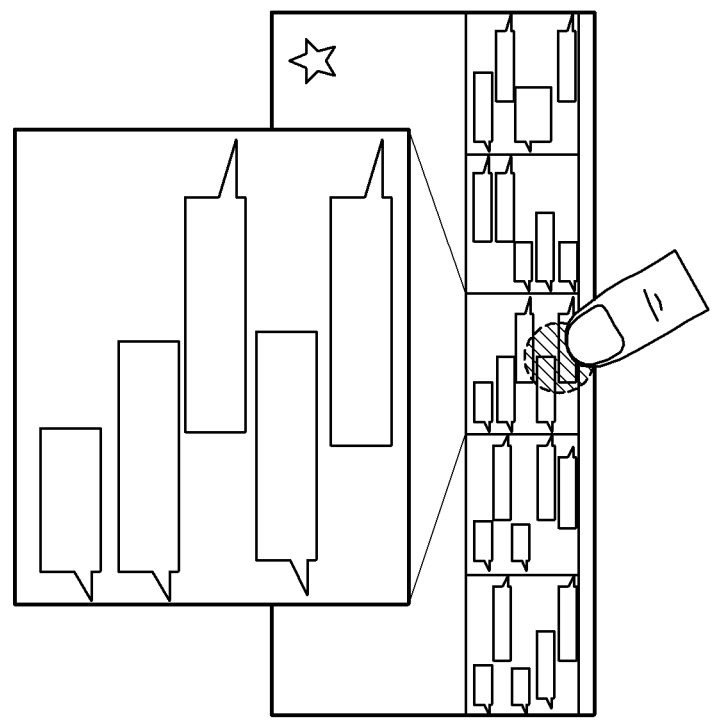
FIG. 15

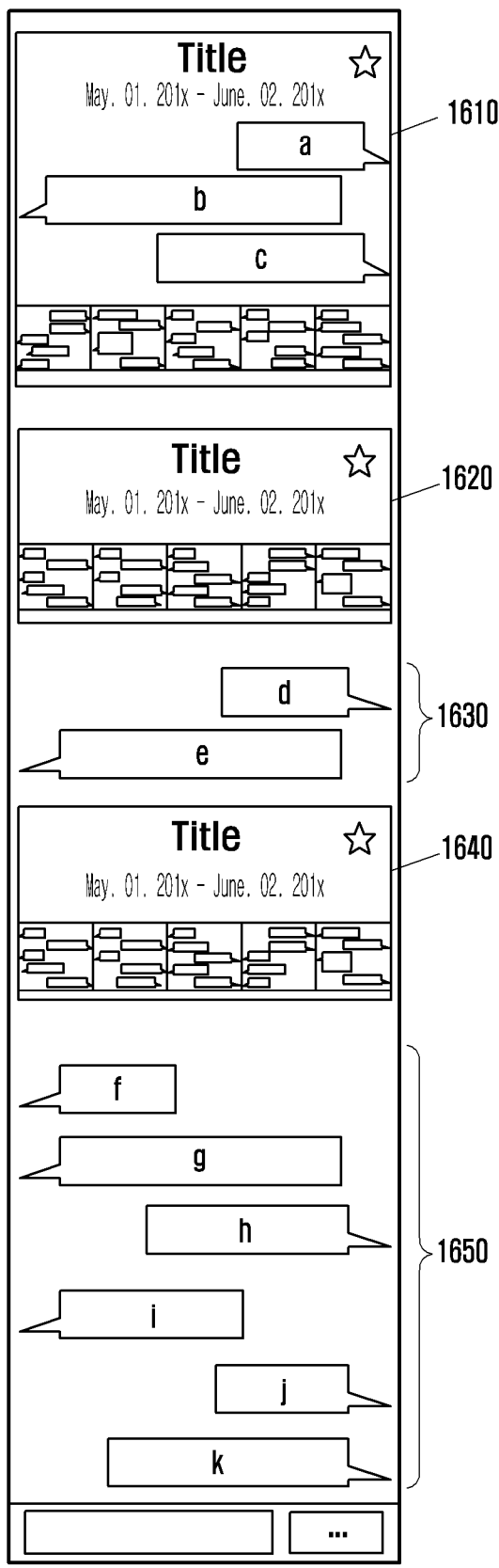
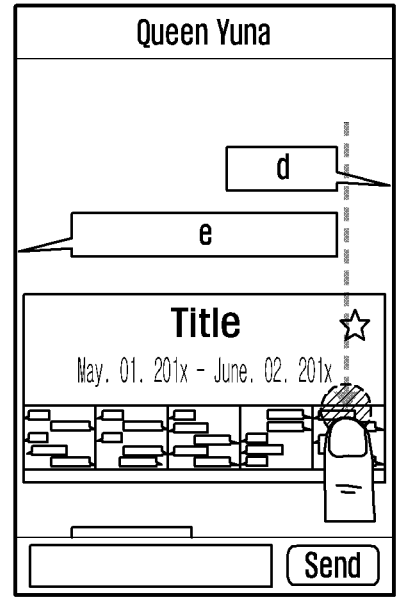
FIG. 16B
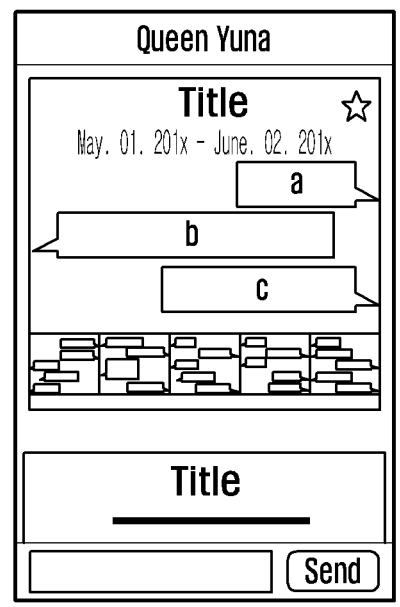
FIG. 16C
FIG. 16A

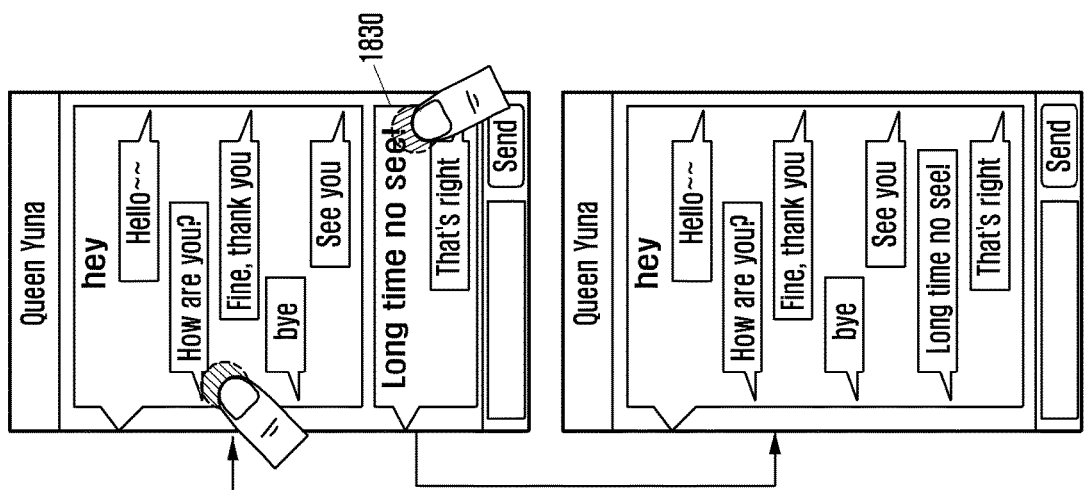

METHOD OF PROVIDING MESSAGE AND USER DEVICE SUPPORTING THE SAME

TECHNICAL FIELD

The present disclosure relates to a method of grouping messages while operating a message based conversation function of a conversation application of a Personal Computer (PC) or a mobile user device, for example, an instant messenger, and a user device supporting the same.

BACKGROUND ART

User devices provide a function of displaying transmitted/received messages, and in recent years, smart phones provide a function of converting an individual message into data and storing and duplicating the data. Furthermore, a particular application distinguishes transmitted/received messages based on a date to inform users of message transmission/reception times and dates, and provides a function of displaying the transmission/reception times of the respective messages.

The above information is presented as background information only to assist with an understanding of the present disclosure. No determination has been made, and no assertion is made, as to whether any of the above might be applicable as prior art with regard to the present disclosure.

DISCLOSURE OF INVENTION

Technical Problem

Aspects of the present disclosure are to address at least the above-mentioned problems and/or disadvantages and to provide at least the advantages described below. Accordingly, an aspect of the present disclosure is to provide a method of providing a message, and a user device supporting the same, which can group messages displayed in a conversation window of the user device into a message group, control such that a newly created message is automatically included into the message group, emphasize the messages displayed in the conversation window, and store contents of a conversation to transmit the same to conversation participants.

Solution to Problem

In accordance with one aspect of the present disclosure, a method of providing a message is provided. The method includes displaying a message with a first attribute through a user device, detecting a user input corresponding to a portion of the message, and providing the portion with a second attribute based on the user input.

In accordance with another aspect of the present disclosure, a user device having a message providing function is provided. The user device includes a display unit configured to display a message with a first attribute, an input unit configured to detect a user input corresponding to a portion of the message, and a controller configured to provide the portion with a second attribute through the display unit based on the user input detected by the input unit.

Advantageous Effects of Invention

As described above, the present disclosure provides a method of providing a message, and a user device supporting the same, which can group messages into a message group according to a selection of a user, thereby reducing menu manipulating operations for managing and searching for messages, and can intuitively display and manage the grouped conversation contents, thereby reducing menu manipulating operations of a user required for searching for messages.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4 illustrates operations of creating and displaying a new message group according to an embodiment of the present disclosure;

FIG. 5 illustrates operations of creating and displaying a new message group according to an embodiment of the present disclosure;

FIG. 15 illustrates an operation of displaying one area in accordance with a selection of a preview item in a folded state according to an embodiment of the present disclosure;

FIG. 16 illustrates a display unit for displaying a plurality of message groups according to an embodiment of the present disclosure;

FIG. 18 illustrates an operation of combining message groups according to an embodiment of the present disclosure;

The same reference numerals are used to represent the same elements throughout the drawings.

MODE FOR THE INVENTION

Figure 1:
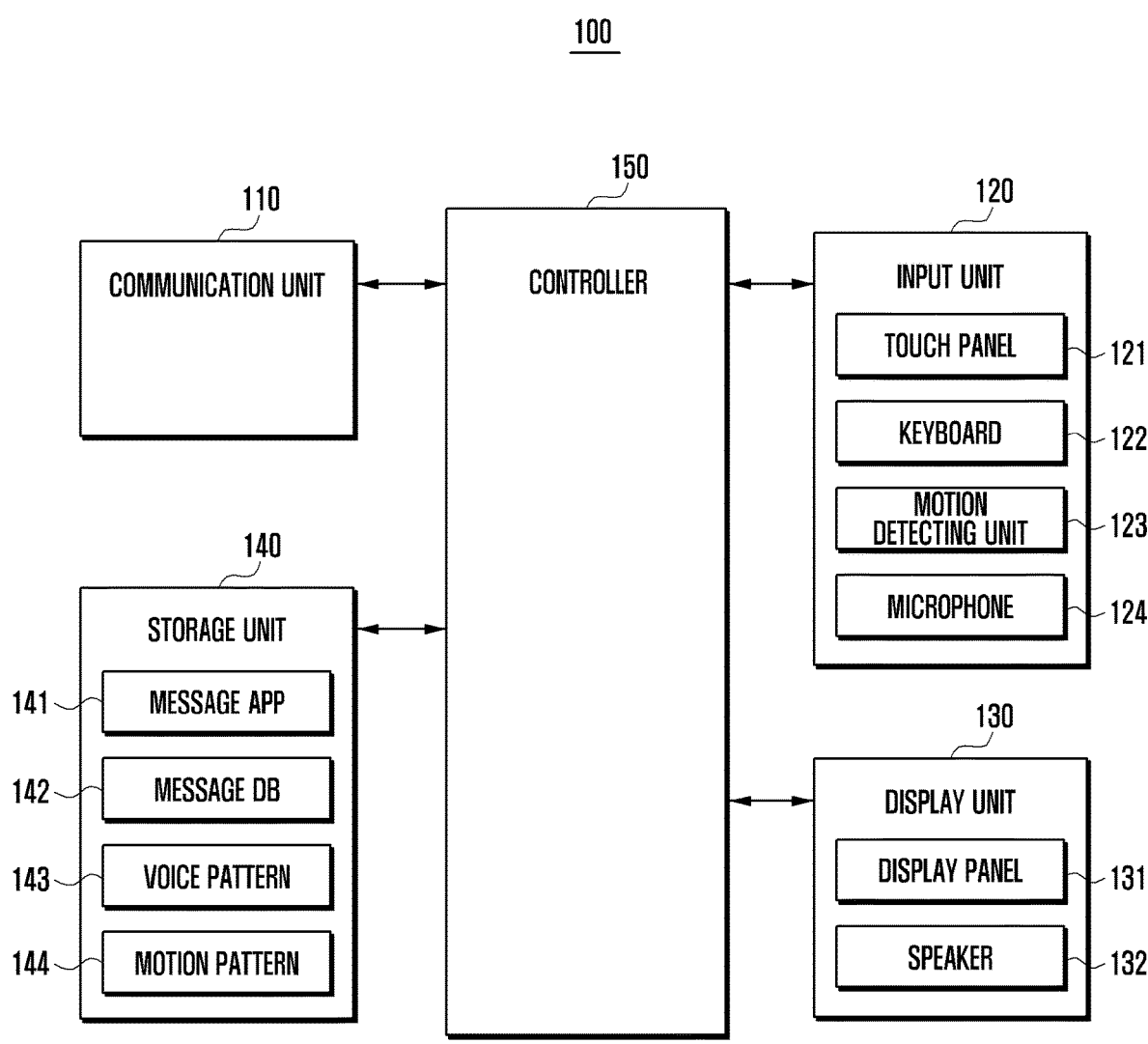
FIG. 1 is a block diagram of a user device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the specification and claims, the term "comprise" does not mean that other elements or operations are excluded. Singular nouns may be intended to include plural nouns unless the context clearly indicates otherwise. For example, "a message" may indicate one message or two or more messages. The suffix "unit" used to indicate a component in the description below has been introduced or used interchangeably only for the purpose of description of the present disclosure and thus does not provide a unique meaning or a function distinguished from each other.

In the specification and claims, the terms "first, second, third, etc." are used to distinguish similar elements, and are not necessarily used to describe elements in sequence or in chronological order. It should be noted that the terms used in such a way may be replaced according to a proper state, and various embodiments of the present disclosure described in the specification may operate according to sequences different from those described or illustrated in the specification.

In the specification and claims, "user device" is an electronic device that is provided with a display configured with one or more touch screens and is configured to execute an application or display content, and for example, may include a tablet Personal Computer (PC), a Portable Multimedia Player (PMP), a Personal Digital Assistant (PDA), a smart phone, a mobile phone, a digital picture frame, and the like.

In the specification and claims, a "message" may include at least one of a text, an image, a video, and a voice, and each message occupies a predetermined space on a display unit of a user device. A boundary line for the space occupied by the message may have a rectangular or speech bubble form, but is not limited thereto. The boundary line may have no thickness, or an interior and an exterior of a message can be distinguished from each other by a color, a material, and shading. A message including only text is defined as a text message, a message including only an image is defined as an image message, and a message including only a video is defined as a video message. When a message includes a video, displaying the message on a screen may include displaying a preview image of the video. When a message includes a voice, displaying the message on the screen may include displaying information on the corresponding voice, for example, a reproduction time of the corresponding voice.

In the specification and claims, a "message group" is a type of boundary display. A boundary line formed by the message group may have no thickness, or the boundary line may distinguish between an interior and an exterior of the message group by a color, a material, and shading. In the specification, a "message included in a message group" implies a message located within the boundary line formed by the message group on the screen. The message may or may not belong to the message group according to an attribute thereof.

In the specification, an "attribute of a message" may include at least one of a shape or size of an area occupied by the message on the screen, a size, a color, a thickness, a transparency or font of text in the message, a size of an image or video in the message, an aspect ratio or transparency of an image or video in the message, a color, a brightness or transparency of a background of the message, presence or absence of a message boundary, and whether the message is included in a message group. In the specification, a "first attribute of a message" implies a default attribute of the message displayed on a display unit of the user device according to an input signal for displaying the message, and may be differently configured according to user devices or may be modified by users of the user devices. In the specification, "emphasizing a message" implies that all or some of message attributes are provided to be different from the first attribute. For example, making a boundary of a speech bubble enclosing a message transparent may correspond to emphasizing the message.

Hereinafter, various embodiments of the present disclosure will be described with reference to the accompanying drawings. In the following description, it should be noted that only portions required for comprehension of operations according to the various embodiments of the present disclosure will be described and descriptions of other portions will be omitted not to make subject matters of the present disclosure obscure. Here, features of the present disclosure are not limited to the aforementioned examples, and it should be understood that the features of the present disclosure include shape modifications of respective elements to be described below or additional functions. In the drawings, some elements may be enlarged for illustration and are not illustrated in proportion to a size thereof.

FIG. 1 is a block diagram of a user device according to an embodiment of the present disclosure.

Referring to FIG. 1, the user device 100 according to the present disclosure may include a communication unit 110, an input unit 120, a display unit 130, a storage unit 140, and a controller 150.

The communication unit 110 establishes communication channels for a voice call, a video call, and data transmission/reception of an image or a message under the control of the controller 150. For example, the communication unit 110 may establish a voice call channel, a data communication channel, and a video call channel between mobile communication systems. Furthermore, the communication unit 110 may establish a message service channel for operating a conversation function. Here, the message service channel may be a service channel for transmitting/receiving various types of messages such as a short message, a multimedia message, an instant message, and the like. The message service channel may include a channel for transmitting messages of the conversation function to other user devices and a channel for receiving messages transmitted by other user devices. The two channels may use different frequency channels or an identical frequency channel.

The communication unit 110 may support message transmission/reception while the conversation function is operated. Furthermore, the communication unit 110 may transmit a message group stored in the storage unit 140 to other user devices when receiving a transmission request for the message group, or may receive a message group from other user devices by transmitting a transmission request to other devices. Here, the communication unit 110 may use at least one other user device's address information indicated by a user so as to transmit the message group. The address information may be registered and managed in advance or according to a new request and a user approval.

The input unit 120 may include a touch panel 121, a keyboard 122, a motion detecting unit 123, a microphone 124, and the like. The input unit 120 may detect a touch signal generated by the touch panel 121, a key signal generated by the keyboard 122, a detection signal generated by the motion detecting unit 123, and a voice signal generated by the microphone 124, and may provide the detected signals to the controller 150.

The touch panel 121 may be disposed on at least one of upper and lower portions of the display panel 131. The touch panel 121 may be a resistive or capacitive type touch panel, and may detect a touch input according to finger contact to transfer information on a location or a type of the touch input to the controller 150. A state in which a user is proximate to an input device without contacting the touch panel is referred to as hovering. According to the various embodiments of the present disclosure, the touch panel 121 may also generate a signal while the input device is hovering over the touch panel 121 without direct contact. The hovering signal input device may include a stylus pen or a finger, but is not limited thereto.

The touch panel 121 may perform a touch effective area processing for various areas and may support generation of a specific touch input signal while a message based conversation function is being operated. For example, the touch panel 121 supports creation of a message according to a user's touch by performing location allocation and effective area allocation for a plurality of texts contained in a message editor while the conversation function is being operated. Furthermore, the touch panel 121 may detect various touch inputs related to creation, management, and search of a message group and transfer the detected touch inputs to the controller 150. The touch input signals detected by the touch panel 121 for operating the conversation function will be described below.

The keyboard 122 may include input keys and function keys for receiving number or text information and configuring various functions. The function keys may include a direction key, a side key, and a shortcut key, which are configured to perform a particular function.

The motion detecting unit 123 may detect a motion of a user or the user device 100 to transfer motion information to the controller 150. The motion of the user or the user device 100 may include at least one of a linear motion of the user device 100, a rotational motion of the user device 100, a shaking motion of the user device 100, and an eye movement of the user. The motion detecting unit 123 may include an acceleration sensor, an angular velocity sensor, a speed sensor, a gravity sensor, a tilt sensor, a gyro sensor, and a camera for capturing image data.

The microphone 124 may detect a user's voice or other audio signals to transfer the audio signals to the controller 150. At this time, the controller 150 determines if voice patterns 143 stored in the storage unit 140 coincides with the detected user's voice, and in a case in which there is a voice pattern that coincides with the detected voice, determines that a user input has been entered.

In addition, the input unit 120 may include a button, a mouse, a remote controller, a jog wheel, a jog switch, or the like as a means for receiving user input signals for manipulation of the user device 100.

The input unit 120 may detect various input signals related to provision of a message by the user device 100. For example, the input unit 120 may detect an input signal for selecting or activating a message application supporting an operation of a message based conversation function, an input signal for creating a message during the operation of the conversation function, and an input signal for identifying a received message. Furthermore, the input unit 120 may detect input signals for selecting transmitted/received messages, and input signals for dividing, integrating, moving, and arranging a generated message group. Moreover, the input unit 120 may detect an input signal for searching for a message group, an input signal for selecting and reading a particular message group, an input signal for transmitting a message group to other user devices, and an input signal for searching message groups.

The display unit 130 may include a display panel 131 and a speaker 132, and may be used as the same meaning as the display panel 131 of the user device 100 according to the various embodiments of the present disclosure.

The display panel 131 may be formed of a Liquid Crystal Display (LCD), a Light Emitting Diode (LED), an Organic Light Emitting Diode (OLED), or the like. The display panel 131 may be disposed at an upper or lower portion of the touch panel. For example, the touch screen may include the touch panel integral to the display panel 131. The display unit 131 displays information input by a user, information to be provided to the user, and various menus of the user device 100. For example, the display unit 131 may provide various screens according to use of the user device 100, for example, a standby screen, a message writing screen, a phone-call screen, and the like. Images for a user interface, pointer images, messages, and objects may be displayed on the screen. The display panel 121 may display a QWERTY key map, a DVORAK key map, a 3*4 key map, a 4*3 key map, or the like which includes a plurality of keys.

The display panel 131 may output various screens according to an operation of a conversation function. For example, during an operation of a message based conversation function, the display panel 131 may provide a screen for displaying messages, a screen for transmitting a completed message, a screen for receiving a message, a screen for creating a message group, a screen for displaying a message group, a screen for a preview item of a message group, and a screen on which display information corresponding to a message group is arranged. Furthermore, the display panel 131 may output a screen for supporting division of a generated message group, a screen for supporting integration of message groups, a screen for supporting a movement of a message group, and a screen for arranging message groups. The display panel 131 may output one or more preview items corresponding to a message group. Moreover, the display panel 131 may output a message input area where a new message may be input.

The speaker 132 may output audio data transmitted/received during a phone-call, audio data contained in a message, and audio data stored in the storage unit 140. The speaker 132 may output a sound effect informing the user of transmission or reception of a message, a sound effect according to a selection or emphasis of a message, a sound effect according to creation or division of a message group, a selection sound according to a preview item, and a sound effect according to a selection or release of a message auto-inclusion function based on user configurations during an operation of a conversation function. Furthermore, the speaker 132 may also support a function for outputting a voice corresponding to message contents according to user configurations.

The storage unit 140 may include a cache memory, a Dynamic Random Access Memory (DRAM), a Static Random Access Memory (SRAM), a flash memory, a magnetic disk storage device, an optical disk storage device, or the like. The storage unit 140 may store various application programs for supporting user functions, key maps to be displayed, menu maps to be displayed, and application programs related to the provision of messages. For example, the storage unit 140 may include a message application 141 having a message conversation function, a message database 142 for an operation of the conversation function, a voice pattern 143, and a motion pattern 144.

The message application 141 supports creation, display, management, storage, transmission/reception, and search operations of a message group. The message application 141 may be activated according to a user's selection or configurations of the user device 100 and may support creation of a message or an output of the received messages. The message application 141 may group a predetermined number of messages together as a message group according to an input signal, for example, a touch input signal, and may output the created message group and incidental information of the message group on the display unit 130. The incidental information of the message group may include title information of the message group, transmission/reception time information for the messages contained in the message group, importance information of the message group, or screen display frequency information of the message group. In this case, all the messages created after the message application 141 is activated are not output and some may be output on the display unit 130. The messages which are not output may be output according to a user request, for example, a scroll input. Furthermore, the message application 141 may divide, combine, move, and arrange message groups according to a user input.

The message database 142 may store various messages created according to an operation of the message application 141, message groups, and incidental information of the message groups. Furthermore, the message database 142 may further store information related to creation, division, combination, transmission/reception, or search of the message groups.

The voice pattern 143 may store voice patterns related to creation, display, management, and search operations of message groups. The voice pattern 143 may be configured in units of phonemes, words, or sentences. The voice pattern 143 may be differentiated in view of an environment such as nationality, district, age, gender, and the like, and may be selectively compared with voice data according to an environment similar to that of a user.

The motion pattern 144 is a configuration for storing motion patterns related to creation, display, management, and search operations of message groups. The motion pattern 144 may include at least one of a linear motion of the user device 100, a rotational motion of the user device 100, a vibration of the user device 100, a touch on the touch panel 121, and a drag on the touch panel 121. The motion pattern 144 may be configured and stored when the user device 100 is manufactured, and may be implemented to be configured, modified, or deleted by a user.

The controller 150 may include microprocessors or microcomputers such as a Central Processing Unit (CPU), a Digital Signal Processor (DSP), and the like. The controller 150 controls a power supply of the user device 100 to perform an initializing operation. The controller 150 may control various signal flows for supporting an operation of a conversation function of the user device 100. For example, the controller 150 may control the display unit 130 to provide the message displayed on the display unit 130 as a second attribute based on a user input corresponding. The controller 150 may determine whether a touch, a drag, or a motion of the user device 100, which is detected by the touch panel 121 or the motion detecting unit 123, coincides with the motion pattern 144 stored in the storage unit 140, and if so, may determine that a user input has been detected. The controller 150 may determine whether a sound measured by the microphone 124 coincides with the voice pattern 143 stored in the storage unit 140, and if so, may determine that a user input has been detected.

Figure 2:
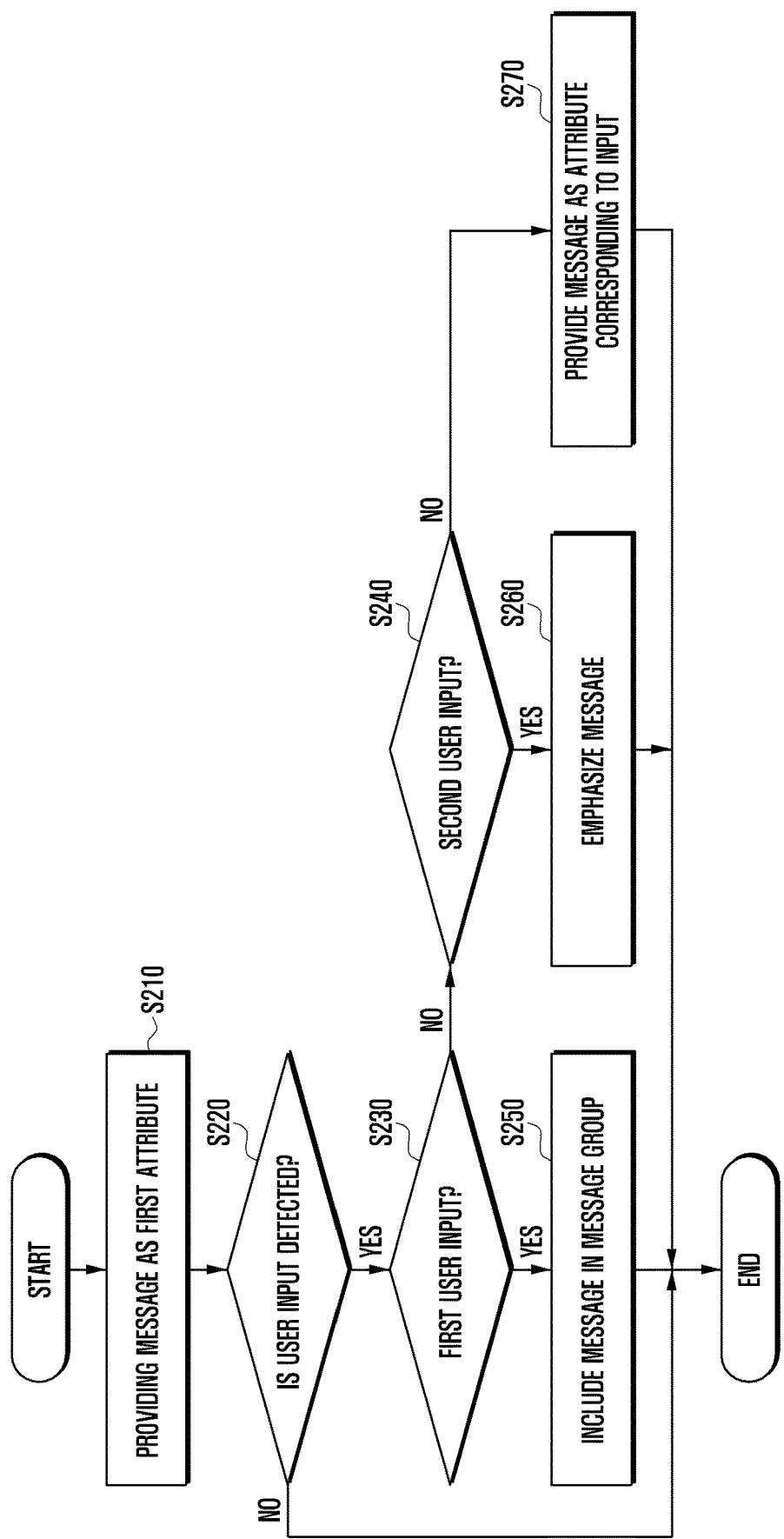
FIG. 2 is a flowchart illustrating operations of grouping messages according to an embodiment of the present disclosure.
Figures 3A, 3B, 3C, 3D, 3E:
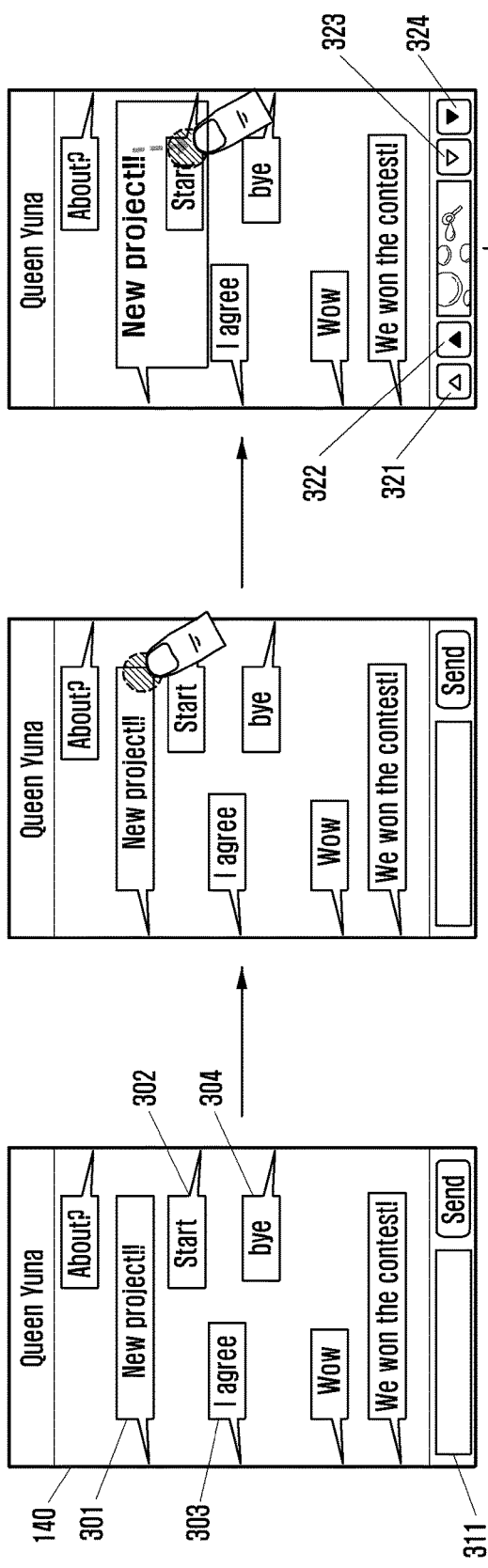
FIG. 3 illustrates operations of creating and displaying a new message group according to an embodiment of the present disclosure.

FIG. 2 is a flowchart illustrating operations of grouping messages according to an embodiment of the present disclosure.

Referring to FIG. 2, when an input signal for performing a message based conversation function is generated, a display unit 130 may provide one or more messages as a first attribute at operation S210. Providing the messages as the first attribute may include, for example, displaying the messages in black if the messages are not included in a message group. Each of the messages may contain at least one of a text, an image, and a video. In the case of the message containing video, the display unit 130 may display a stream of the video or a preview image of the video. When an input is entered for selecting the preview image of the video, the display unit 130 may be implemented to stream the video.

A controller 150 may determine whether a user input corresponding to at least some of the messages provided as the first attribute to the display unit 130 is detected through an input unit 120 at operation S220. The user input may include at least one of a keyboard, a button, a drag, a gesture, a voice, and hovering. The controller 150 may differentiate the user input as a first user input or a second user input based on the detected user input information. The user input information may include at least one of an input strength, an input direction, an input intensity, an input location, a number of inputs, an input type, an input speed, an input distance, an input indicating hovering, and an indication of the input source.

The controller 150 may provide at least some of the messages corresponding to the user input as a second attribute based on the detected user input. The second attribute may include at least one of a message type, message contents, and a display method. The providing of the messages as the second attribute may include at least one of including the at least some messages in a message group and emphasizing the at least some messages. The operation of providing the messages as the second attribute may include an operation of displaying the at least some messages corresponding to the user input in red. When the messages contain text, the providing the messages as the second attribute may include making a design of the text and displaying the same or displaying an image corresponding to the text. When the messages contain an image or a video, the operation of providing the messages as the second attribute may include an operation of displaying a border of the image or the video in red. The operation of providing the messages as the second attribute may further include an operation of determining the second attribute based on information of the at least some messages corresponding to the user input. The information of the at least some messages may include at least one of a message type, message contents, and the first attribute. For example, in the case where the at least some messages contain the image or the video and in the case where the at least some messages contain only the text, a method of displaying the message group may be differently configured.

An input by which a user of the user device selects messages to be included in a message group so as to create the message group is referred to as a first user input. When the user input is detected through the input unit 120, the controller 150 may determine whether the user input corresponds to the first user input at operation S230. When the user input corresponds to the first user input, the controller 150 may display the at least some messages corresponding to the user input in a message group at operation S250. The first user input may include at least one of dragging the selected messages, hovering over the selected messages, a selection input through a keyboard, a voice input through a microphone 124, and a motion input of a user, and a motion of the user device.

The operation of including the messages in the message group may include an operation of displaying the message group based on information of the at least some messages included in the message group. For example, one of the at least some messages may be used as title information of the message group or transmission/reception time information for one of the at least some messages may be displayed together with the message group.

When a new message is acquired, the new message may be included in the message group. For example, when a user inputs and transmits a new message or receives a message from another user device, the controller 150 may include the newly transmitted/received messages in the message group. In this case, the controller may determine the message group including the new message based on a user input.

A user input for emphasizing and displaying a message is may be a second user input. When it is determined that the user input does not correspond to the first user input, the controller 150 may determine whether the user input corresponds to the second user input at operation S240. When the user input corresponds to the second user input, the controller 150 may control the display unit 130 to emphasize the at least some messages corresponding to the user input at operation S260. The second user input may include at least one of an input for dragging the selected messages, hovering over the selected messages, a selection input through the keyboard 122, a motion input through the motion detecting unit 123, and a voice input through the microphone 124. According to the various embodiments of the present disclosure, the first user input may correspond to a vertical drag input and the second user input may correspond to a horizontal drag input. According to the various embodiments of the present disclosure, the first and second user inputs may include a touch input for one or more messages displayed on the display unit 130, a voice input through the microphone 124, or a motion input through the motion detecting unit 123.

In the above-described embodiment, when the first user input is not detected, the determination is made as to whether the second user input is detected. However, the controller 150 may also configured such that a determination is made as to whether the first user input is detected when the second user input is not detected.

In the above-described embodiment, when the first user input is detected, the messages corresponding to the first user input detected are included in the message group. Here, the operation of including the messages corresponding to the first user input in the message group may further include an operation of emphasizing some of the messages corresponding to the first user input.

FIGS. 3(a), 3(b), 3(c), 3(d), and 3(e) illustrate operations of creating and displaying a new message group according to an embodiment of the present disclosure.

Referring to FIG. 3, when messages are selected by a drag of a first user input, such a drag may be referred to as a first drag. A message located at a point where the first drag starts is a first message, and a message located at a point where the first drag ends is a second message. When there is no message at the point where the drag ends, a message located to be closest to the point where the drag ends may be determined as the second message. In a case in which the first drag starts from a plurality of points, the first message may be a plurality of messages. In a case in which the first drag ends at a plurality of points, the second message may be a plurality of messages. In a case in which the first user input does not include a drag, the first and second messages may refer to messages located at both ends, respectively, among messages selected by a user. A controller 150 may identify whether the first user input is detected between the first and second messages. For example, the controller 150 may display and emphasize at least one of the first and second messages though there is no second user input when the first user input is detected.

As illustrated in FIG. 3(*a*), when an input signal for performing a message based conversation function is detected, a display unit 130 may display messages received from other user devices and messages transmitted to other user devices. When the input signal for performing the message based conversation function is detected, the controller 150 may execute a message application. Hereinafter, an operation of grouping four messages 301 to 304 into one message group will be described.

A user of the user device may select at least one message which will be used as title information of the message group or positioned at an uppermost portion of the message group. At this time, selecting the at least one message may include a single touch, a multi-touch, a touch for a predetermined time interval or more, or a touch on a specific area within the message. The title information of the message group implies a text, an image, a video, or a combination thereof which represents the message group or expresses contents of the message group. Referring to FIG. 3(*b*), a message 301 is selected by a touch thereon through a touch panel 121.

The user of the user device may drag the message in a specific direction. When a first drag starts, the controller 150 may control the touch panel 121 to display a message group to be created, in which case the message group may be implemented to vary in size in response to the drag. Furthermore, when the first drag starts, the controller 150 may control the touch panel 121 such that the selected message is automatically emphasized and displayed without a separate input. Referring to FIGS. 6(*a*) to 6(*c*), a message is emphasized and displayed by a separate second user input. For example, in a case in which the selected message has a separate boundary, for example, a speech bubble type boundary, if a drag for the selected message starts, the boundary may not be displayed. Referring to FIG. 3(*c*), when the first drag starts from the message 301, the message 301 is emphasized and a speech bubble boundary for the message 301 is removed. As the message 301 is emphasized and the boundary thereof is removed, the message 301 may be displayed as title information of the created message group 310.

When the message based conversation function is preformed, the display unit 130 may display a message input area 311, and if the first drag starts, the message input area 311 may be changed to include an editing menu. As illustrated in FIG. 3(*c*), the editing menu may include buttons 321 to 324 for moving a screen.

Referring to FIG. 3(*d*), the first drag ends at a position of a message 304. For example, FIG. 3(*d*) illustrates ending of the drag when the message 304 serves as the second message. When the first drag ends, the controller 150 may determine the first message 301, the second message 304, and all messages between the first and second messages 301 and 304 as messages corresponding to the first user input. Referring to FIG. 3(*e*), a message group 310 including the messages 301 to 304 corresponding to the first user input is created and displayed according to the first user input. The displayed tile information of the message group may be changed to another message by a user's input.

FIGS. 4(*a*), 4(*b*), 4(*c*), and 4(*d*) illustrate operations of creating and displaying a new message group according to an embodiment of the present disclosure.

Referring to FIG. 4(*a*), messages 401 and 404 are selected by a multi-touch, and the selected messages are dragged toward each other. In this case, the messages 401 and 404 located at points where a first drag starts correspond to first messages.

Referring to FIG. 4(*b*), the first drag ends at a position of a message 403. For example, the message 403 corresponds to a second message in the embodiment illustrated in FIGS. 4(*a*) to 4(*d*). When the drag ends at the position of the message 403, a message group 410 is created and displayed as illustrated in FIG. 4(*c*). Although the message group does not appear in FIG. 4(*b*) before the first drag ends, two message groups may also be displayed in response to the drag.

Referring to FIG. 4(*c*), when the first user input ends, the message 401 located at an upper side among the first messages is displayed as title information of the message group. In another example, as illustrated in FIG. 4(*d*), the second message 403 may also be displayed as the title information of the message group. Likewise to FIGS. 3(*a*) to 3(*e*), when the drag starts or ends, the message displayed as the title information of the message group may be emphasized and displayed, a boundary of the message may be removed and the displayed title information of the message group may be changed to another message by a user's input.

FIGS. 5(*a*) to 5(*d*) illustrate operations of creating and displaying a new message group according to an embodiment of the present disclosure.

Referring to FIGS. 5(*a*), 5(*b*), 5(*c*), and 5(*d*), a message 502 located at a point where a first drag starts corresponds to a first message. Referring to FIG. 5(*a*), the message 502 is selected by a multi-touch, and the touch is dragged in opposite directions. In this case, a controller 150 may control a display unit 130 to display a message group which is enlarged in two directions in response to the first drag.

In the embodiment illustrated in FIGS. 5(*a*), 5(*b*), 5(*c*), and 5(*d*), messages 501 and 504 correspond to second messages. Referring to FIG. 5(*b*), the first drag ends at positions of the messages 501 and 504. When the drag ends at the positions of the messages 501 and 504, a message group 510 is created and displayed as illustrated in FIG. 5(*c*).

Referring to FIG. 5(*c*), the message 501, one of the second messages, is displayed as title information of the message group. For example, as illustrated in FIG. 5(*d*), the first message 502 may also be displayed as the title information of the message group. Similar to FIGS. 3(*a*) to 3(*e*), when the drag starts or ends, the message displayed as the title information of the message group may be emphasized and displayed, a boundary of the message may be removed, and the displayed title information of the message group may be changed to another message by a user's input. In another example, a message type or message contents may be modified based on information of a message. A message having text "Good" may be provided as a message including an image corresponding to "Good."

The first user input is not limited to the above-described example and for example, a pinch zoom out in a state of selecting two messages by a multi-touch may also be configured as the first user input. Further, after selecting two messages by a touch, shaking the user device 100 may also be configured as the first user input. Moreover, selecting one message by a touch of an input means, moving the input means in a hovering state to a position of another message, and selecting the another message by a touch of the input means may also be configured as the first user input. In an operation of creating a message group, the message group may be created by selecting at least one of the first and second messages through a gesture input or button input corresponding to at least one message.

Referring to FIGS. 3 to 5, the message is emphasized without the second user input while the message group is being created. For example, when a second user input is entered, a message may be emphasized.

Figure 6C:
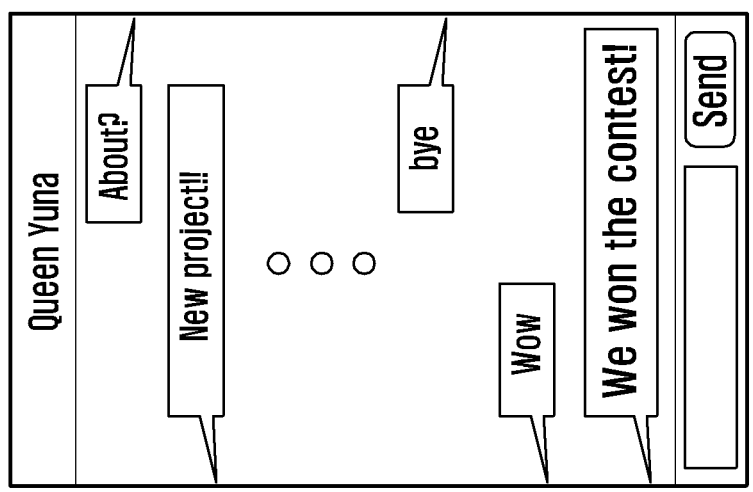
FIG. 6 illustrates operations of emphasizing and displaying a message according to an embodiment of the present disclosure.
Figure 6B:
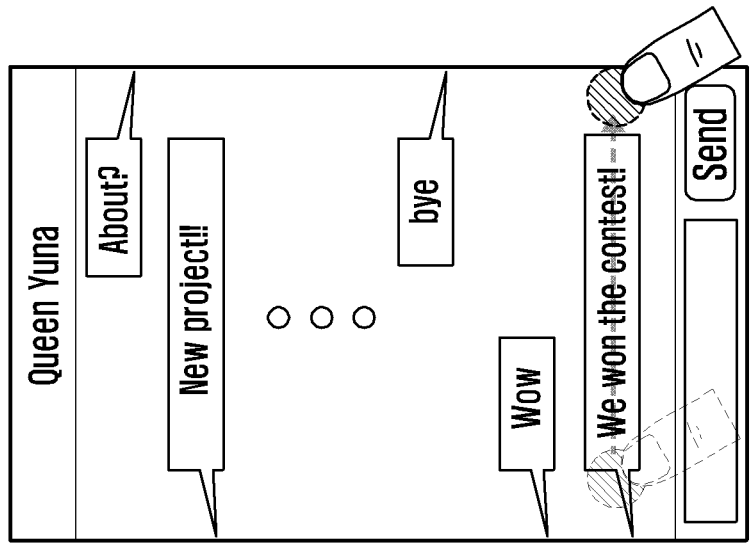
Figure 6A:
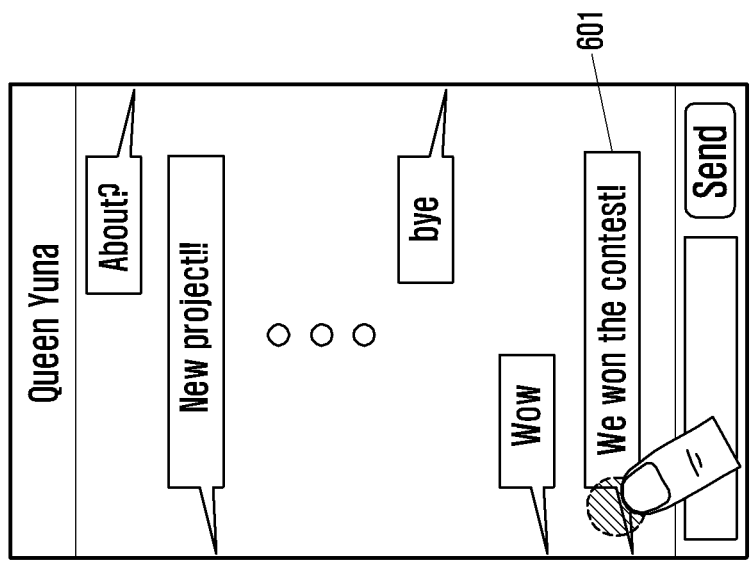

FIGS. 6(a), 6(b), and 6(c) illustrate operations of emphasizing and displaying a message according to an embodiment of the present disclosure.

A user of a user device may select a message to be emphasized by touching message 601 as illustrated in FIG. 6(a). A second user input may include dragging the selected message in a particular direction as illustrated in FIG. 6(b). In a case where a first user input includes a first drag, a direction of the drag included in the second user input may be configured to be different from that of the first drag. Although the drag included in the second user input is a rightward drag in FIG. 6(b), the drag is not limited thereto, and when a drag is made from a left side to a right side of a message or in a diagonal direction, a message may also be emphasized. Referring to FIG. 6(c), a message is emphasized according to the second user input. Although the second user input includes the drag in FIGS. 6(a) to 6(c), the second user input is not limited thereto and may include touching a message to be emphasized for a predetermined time interval and touching a message twice. Furthermore, moving an input means in a horizontal direction while the input means is hovering over a message to be emphasized may also be configured as the second user input.

Figure 7A:
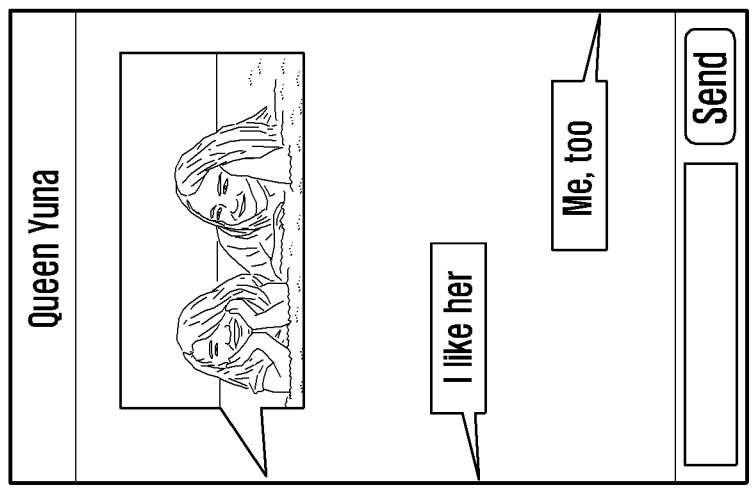
FIG. 7 illustrates operations of emphasizing and displaying an image message according to an embodiment of the present disclosure.
Figure 7B:
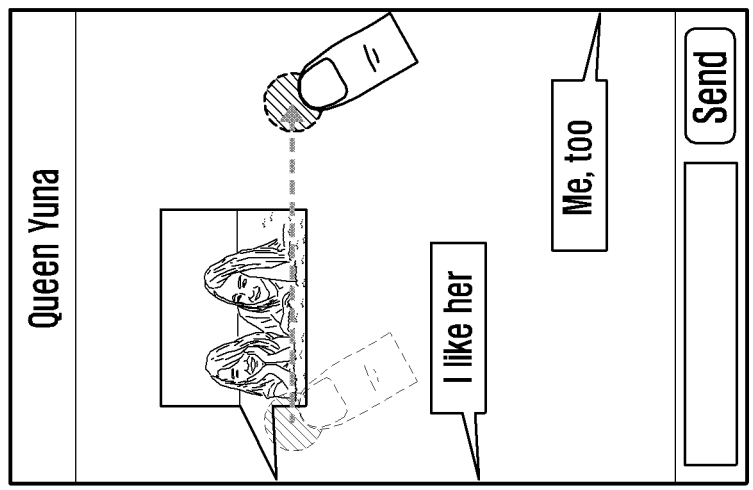
Figure 7C:
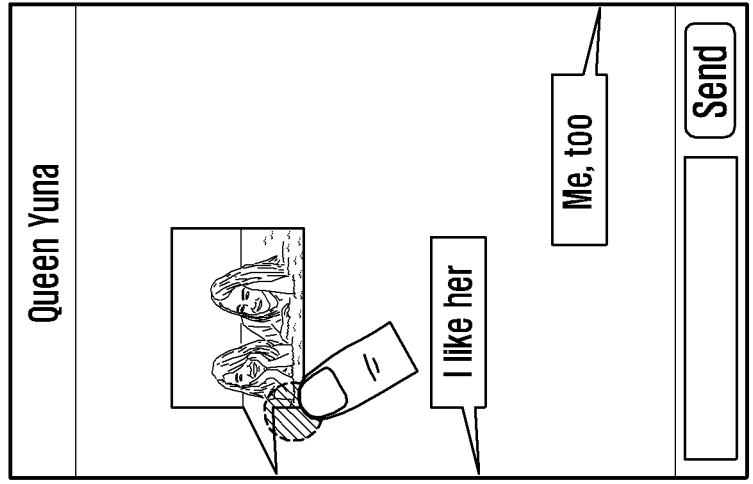

FIGS. 7(a), 7(b), and 7(c) illustrate operations of emphasizing and displaying an image message according to an embodiment of the present disclosure.

Similar to the text message of FIGS. 6(a) to 6(c), a message is emphasized and displayed when a second user input is detected.

For example, emphasis on a message may be released when a message emphasis release event occurs. The message emphasis release event may include an input by a user. For example, in FIG. 6(c), dragging an emphasized message 601 leftward may be configured as the message emphasis release input. The message emphasis release input may also be configured as the same input as the second user input. The message emphasis release event may also occur for the message used as the title information of the message group when the message group is dispersed.

The second user input may or may not be made while the message group is being created, and the message displayed on the display unit 130 may be emphasized regardless of the message group. Furthermore, in a case of creating and transmitting a message, the message may be emphasized and then transmitted.

Figure 8A:
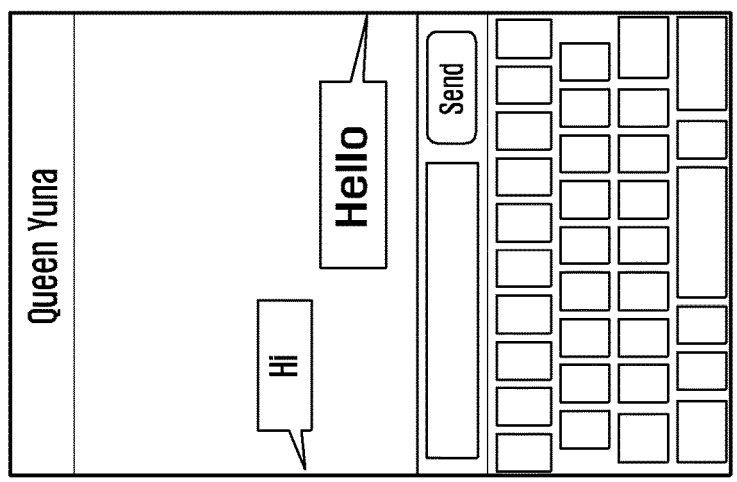
FIG. 8 illustrates operations of emphasizing a message while transmitting the message according to an embodiment of the present disclosure.
Figure 8B:
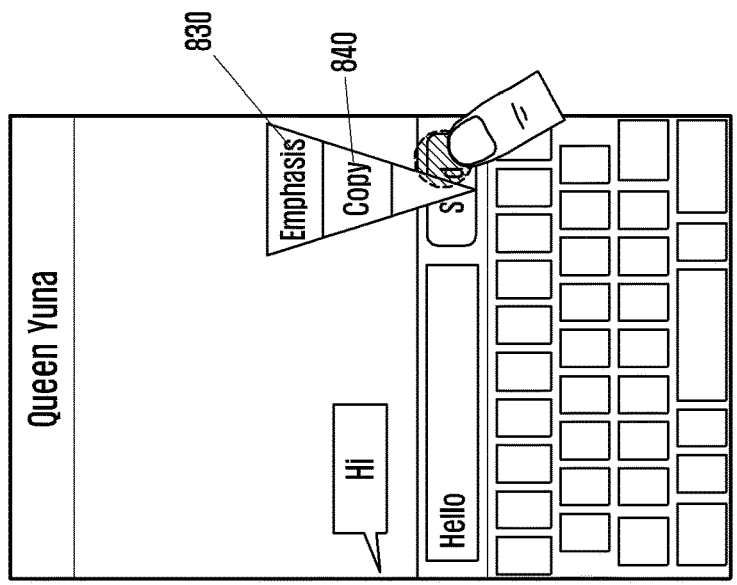
Figure 8C:
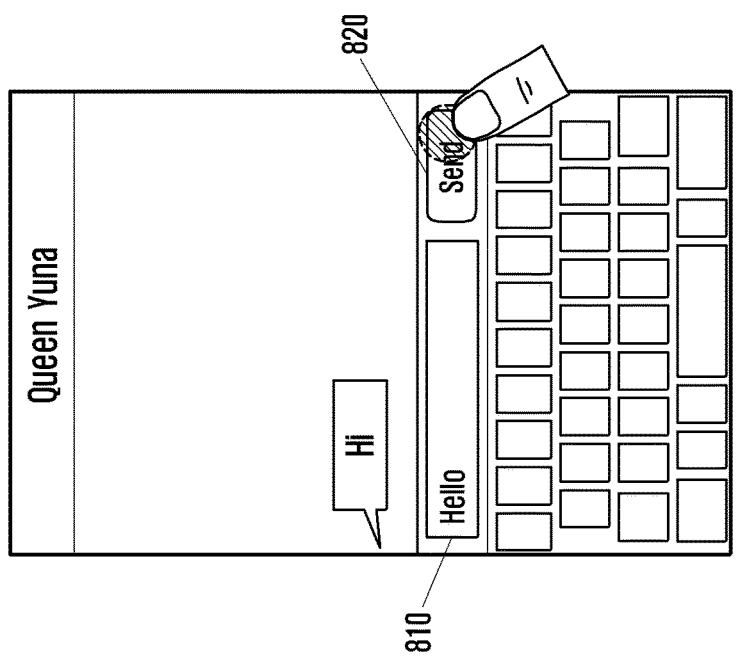

FIGS. 8(a), 8(b), and 8(c) illustrate operations of emphasizing a message while transmitting the message according to an embodiment of the present disclosure.

Referring to FIG. 8(a), message "Hello" is input in a message input area 810 and then a send button 820 is touched. Referring to FIG. 8(b), an option menu for the sending button is displayed by touching the sending button 820 for a predetermined time interval or more. Although the option menu displayed in FIG. 8(b) includes an emphasis function button 830 and a copy function button 840, the option menu is not limited thereto, and the option menu may additionally include other function buttons or may include only the emphasis function button. Referring to FIG. 8(c), the message is transmitted while being emphasized by selecting the emphasis function button 830. For example, an image corresponding to the message "Hello" may be provided.

Figure 9A:
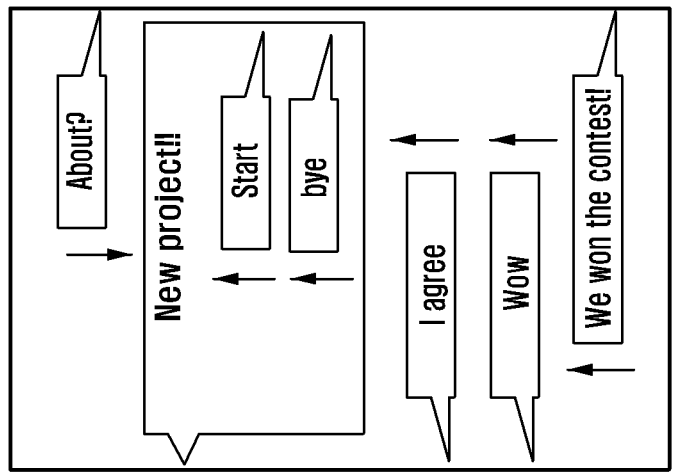
FIG. 9 illustrates operations of adjusting a gap between messages displayed on a display unit during creation of a message group according to an embodiment of the present disclosure.
Figure 9B:
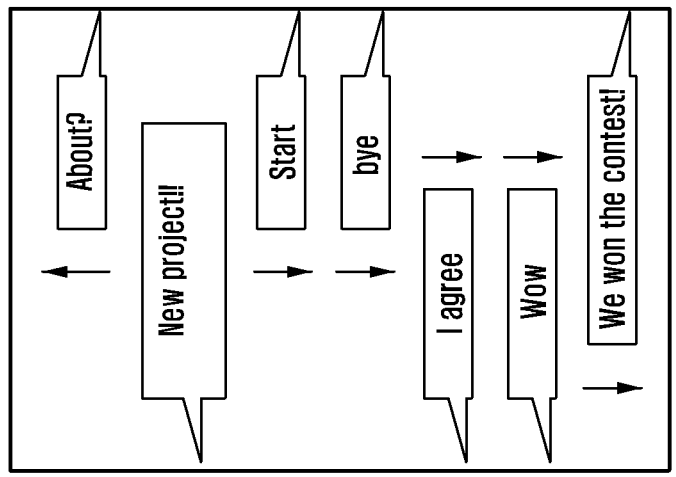
Figure 9C:
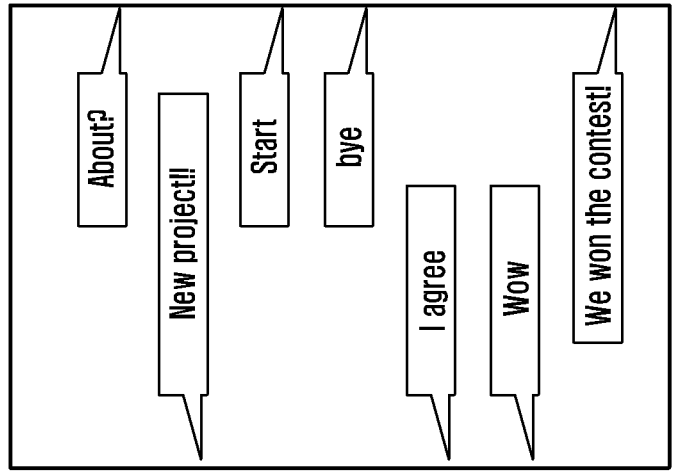

FIGS. 9(a), 9(b), and 9(c) illustrate operations of adjusting a gap between messages displayed on a display unit during creation of a message group according to embodiment of the present disclosure.

When a message group which is being created is displayed before a first drag ends, the message group may change in size in response to the first drag. In this case, a position of messages which are not included in the message group may change such that a distance between the message group and a message closest to the message group among the messages which are not included in the message group is constant. Furthermore, a distance between contiguous messages included in the message group may be configured to be smaller than that between contiguous messages which are not included in the message group.

Referring to FIG. 9(a), when displaying two or more messages, a display unit 130 may display the messages such that a gap between the contiguous messages is constant. For example, as illustrated in FIG. 9(b), even when a message is emphasized, the controller 130 may control the display unit 130 such that a gap between the emphasized message and a message adjacent thereto is constant. In another example, as illustrated in FIG. 9(c), when messages are included in a message group according to a first drag, a gap between the messages included in the message group may be smaller than that between the messages not included in the message group. In another example, a distance between contiguous message groups or a distance between a message group and a contiguous message that is not included in the message group may be displayed to be identical to that between contiguous messages which are not included in the message group. In another example, an animation effect may be additionally displayed when the gap between the messages is adjusted. For example, when a gap between contiguous messages included in a message group is adjusted to be narrower than that between messages which are not included in the message group, an animation effect may similar to a gravitational force is applied between the contiguous messages included in the message group.

Displaying a message input area 311 capable of receiving a new message on the display unit 130 is an input mode. Meanwhile, displaying incidental information of a message group is a reading mode. The input mode and the reading mode are distinguished from each other for convenience and according to an embodiment of the present disclosure, the message input area and the additional information may be displayed together or neither of them may also be displayed without distinction between the input mode and the reading mode. When distinguishing the input mode from the reading mode, the mode may vary depending on a preconfigured condition or a user input. Changing the mode according to the preconfigured condition may include automatically changing to the reading mode after a particular time interval when a message group is created in the input mode.

The controller may determine at least one of the messages displayed in a message group and a size of the displayed message group based on at least one of the pre-configured condition and the user input. A state of displaying, on a screen messages other than a message used as title information is defined as an unfolded state and a state of not displaying the same on the screen is defined as a folded state. Providing the message group to the display unit 130 in the unfolded or folded state may be based on at least one of the preconfigured condition or the user input. FIGS. 10 to 13 illustrate a message group in the unfolded state, and FIGS. 14 and 15 illustrate a message group in the folded state.

Figure 10:
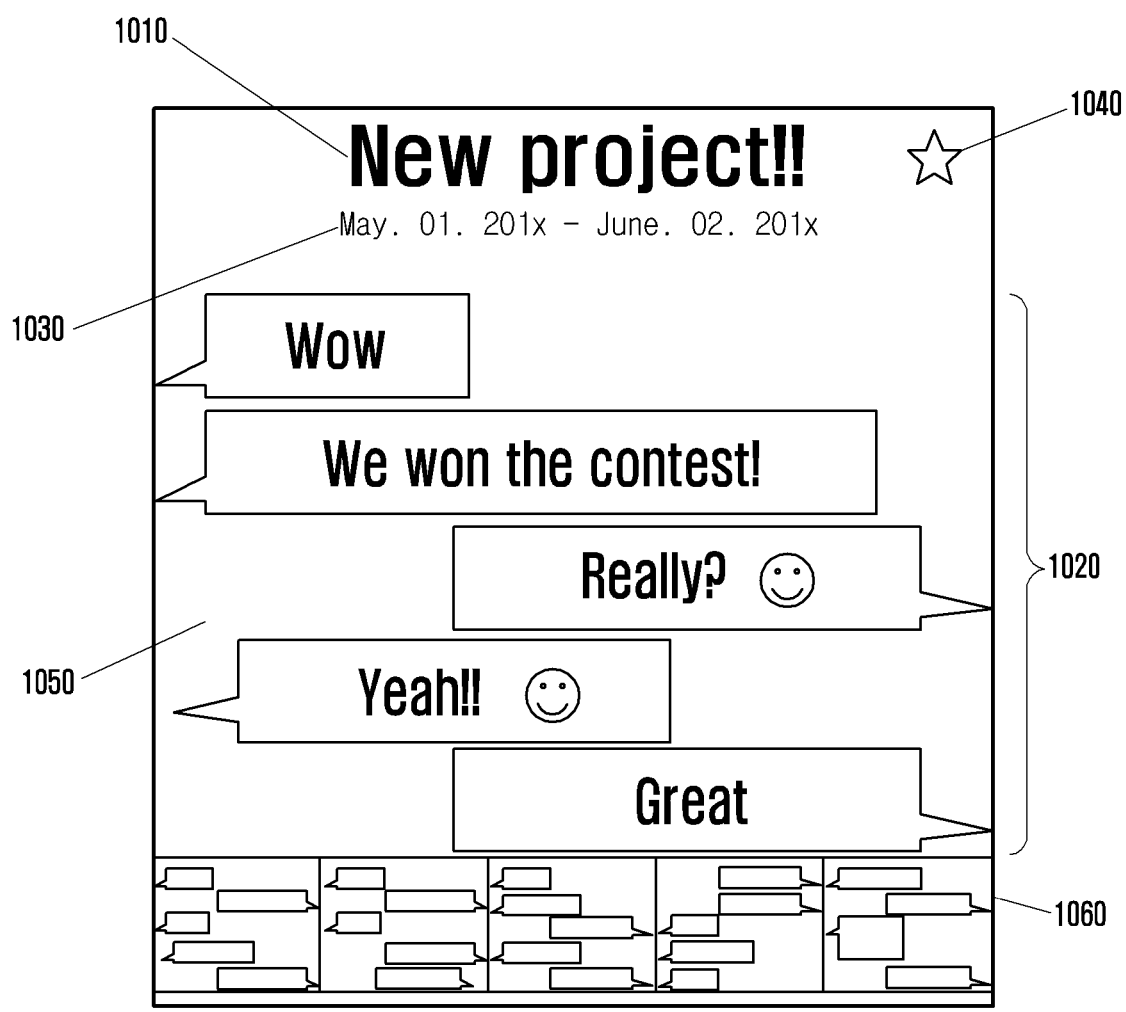
FIG. 10 illustrates a message group in an unfolded state according to an embodiment of the present disclosure.

FIG. 10 illustrates a message group in an unfolded state according to an embodiment of the present disclosure.

Although the message group is displayed in a reading mode in FIG. 10, the message group in the unfolded state may also be displayed when not in the reading mode.

Referring to FIG. 10, incidental information of the message group, for example, transmission/reception time information 1030 of the message, an identifier 1040 for displaying information on the message group, and preview items 1060 are displayed. Further, in FIG. 10, title information 1010 of the message group is displayed separately from other messages included in the message group. Displaying the message group is not limited to the form illustrated in FIG. 10. For example, only some items illustrated in FIG. 10 or only the messages may be displayed, and items which are not illustrated in FIG. 10 may also be displayed. Furthermore, a location and a form of the incidental information of the message group may be different from those illustrated in FIG. 10.

The controller may configure such that a size of the message group displayed on a display unit 130 is not larger than a predetermined size. In a case where the display unit 130 may not display all the messages in the message group, the controller may be configured such that all the messages included in the message group can be read through a scroll function. In a case where the display unit 130 displays only some of the messages included in the message group, the messages displayed by default may include at least one of most recently transmitted/received messages, first transmitted/received messages, the message last read, and a most frequently read message.

Displaying the message transmission/reception times 1030 may include at least one of displaying all transmission times or reception times of the respective messages, displaying a transmission time or reception time of the first or last message to be transmitted or received as a representative, and displaying a time difference between first transmission/reception times and last transmission/reception times. For example, in a case of displaying transmission/reception times of messages which are not transmitted/received on the day when a user reads the messages, a date may be displayed together or only the date may be displayed.

The identifier 1040 may represent importance value information or screen display frequency information of the message group. The importance value information or the screen display frequency information of the message group may also be represented through a background color or a material 1050 of the message group. For example, a color or shape of the identifier or the background color or the material of the message group may have a default value and may be changed and displayed according to the importance value or an access frequency of the message group.

The preview items 1060 are items for displaying a preview for an area within the message group. When a user selects one of the preview items, the display unit 130 displays an area corresponding to the selected preview item on a screen. Displaying the preview items in the reading mode may be configured as a default. For example, in a case where a message group is being created or a message auto-inclusion mode is being executed, the preview items may not be displayed.

For example, the number of preview items displayed on the display unit 130 may be limited. In the case of FIG. 10, five preview items are displayed. Preview items which are not displayed may be configured to be displayed by a scroll function. Furthermore, if preview items are displayed, an arrangement order of the preview items may be modified by a user input.

Figure 11:
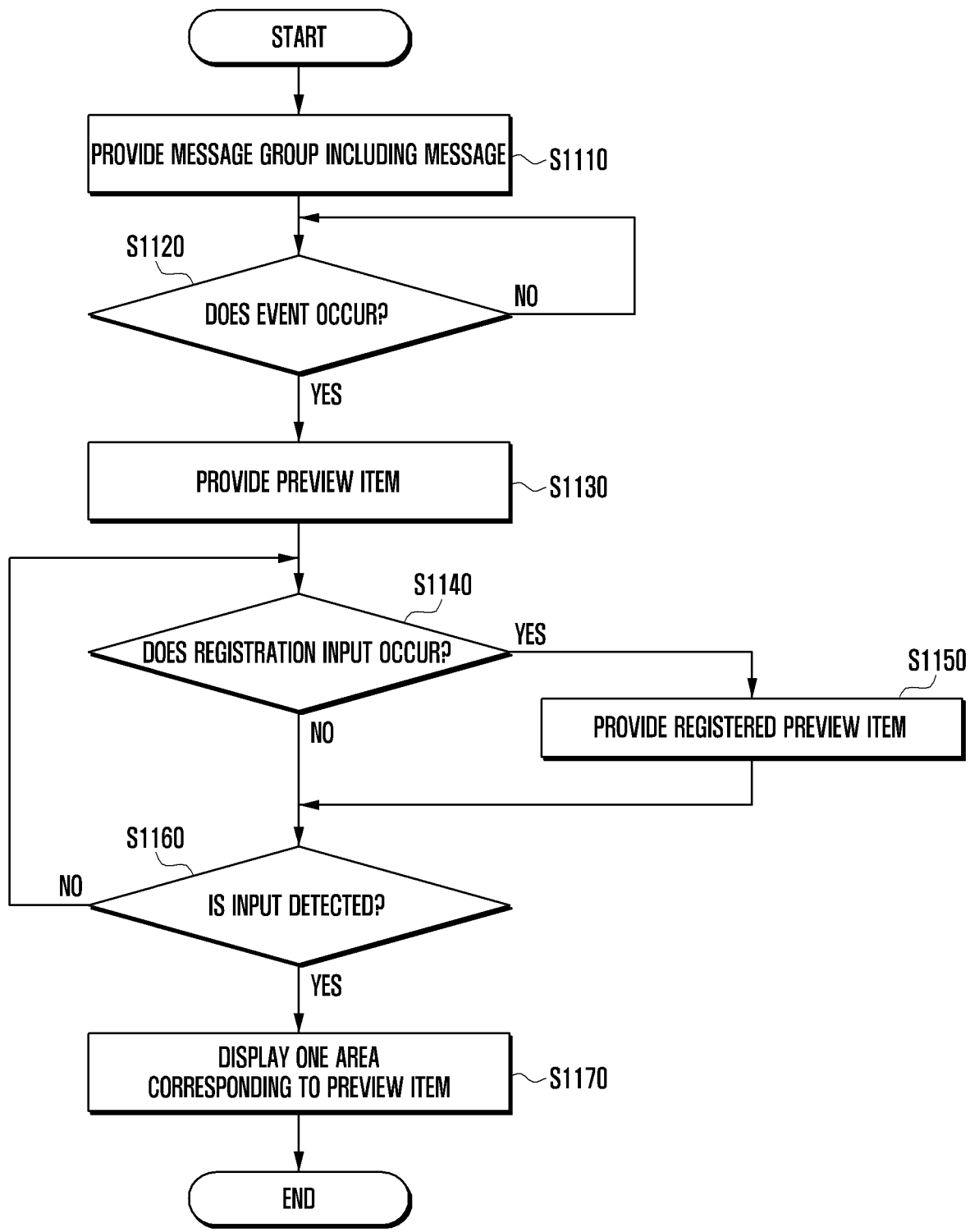
FIG. 11 is a flowchart illustrating operations of displaying, registering, and selecting a preview item according to an embodiment of the present disclosure.

FIG. 11 is a flowchart illustrating operations of displaying, registering, and selecting a preview item according to an embodiment of the present disclosure.

Referring to FIG. 11, a display unit 130 may provide a message group including at least one message at operation S1110. A controller 150 may determine whether a display event of a preview item corresponding to an area of the message group occurs at operation S1120. The display event of the preview item may include a display input of the preview item, a registration input of the preview item, and a change to the reading mode. When it is determined that the display event of the preview item has occurred, the preview item corresponding to one area of the message group is provided through the display unit 130 at operation S1130.

The controller 150 may determine whether the registration input of the preview item occurs at operation S1140. In this case, an input operation of registering the preview item may include an operation of selecting messages corresponding to the preview item. For example, the display unit 130 may create and display a new message group including some messages within the message group. One message group including another message group is illustrated in FIG. 12(c). In the case where one message group includes another message group, a preview item may be registered for the other message group included in one message group. The registration input of the preview item may be made to correspond to the other message group included in one message group as well as messages included in one message group. When it is determined that the registration input of the preview item has occurred, the display unit 130 provides the preview item including a newly registered preview item at operation S1150.

The controller 150 may determine whether an input is detected for the preview item at operation S1160. When it is determined that the input has been detected, the controller 150 displays an area of the message group corresponding to the preview item within the message group or in a popup window at operation S1170. For example, when a user selects any one of the preview items, one area of the message group including specific messages or message group corresponding to the selected preview item is displayed on the display unit 130.

Figure 12A:
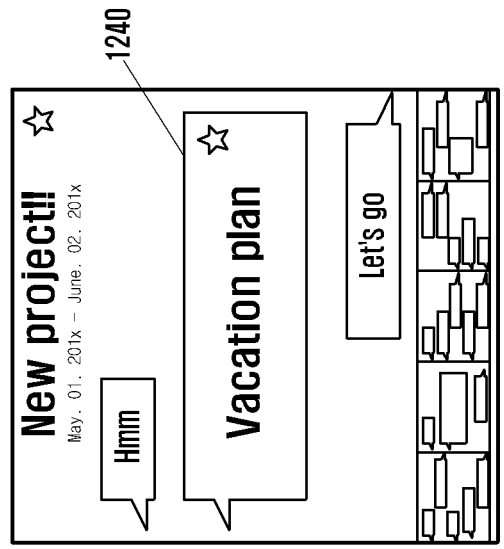
FIG. 12 illustrates operations of displaying one area in accordance with a selection of a preview item in an unfolding state according to an embodiment of the present disclosure.
Figure 12B:
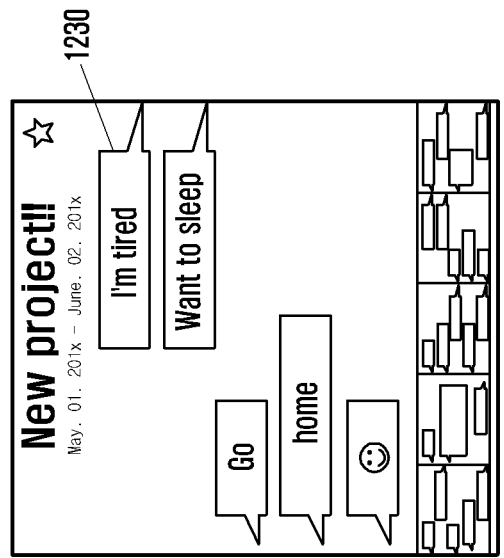
Figure 12C:
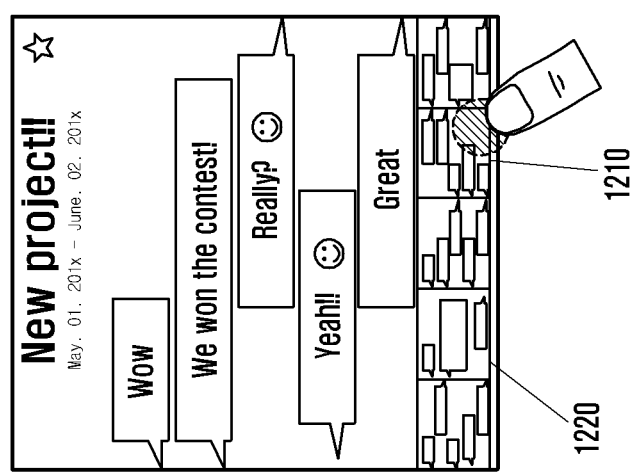
Figure 13C:
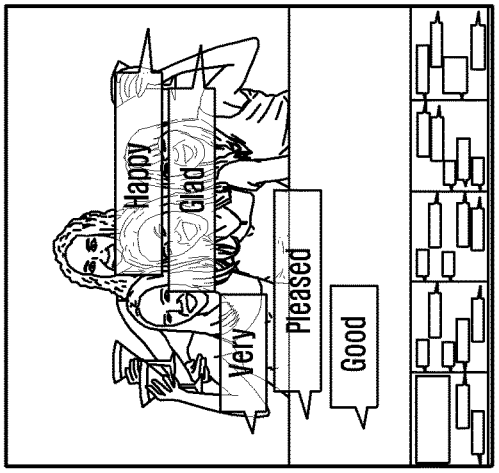
FIG. 13 illustrates methods of displaying a message group in an unfolded state when title information of the message group includes an image or a video according to an embodiment of the present disclosure.
Figure 13D:
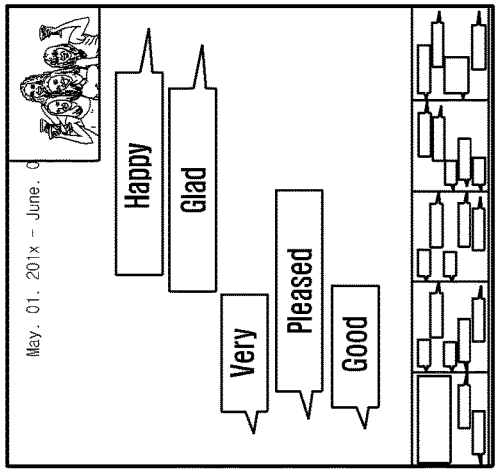
Figure 13B:
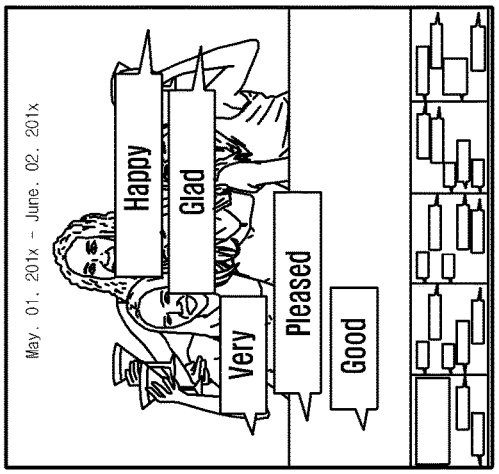

FIGS. 12(a), 12(b), and 12(c) illustrate operations of displaying one area in accordance with a selection of a preview item in an unfolding state according to an embodiment of the present disclosure.

Referring to FIG. 12(a), touching and selecting one item 1210 of preview items is illustrated on a display unit 130. Referring to FIG. 12(b), one area including a message 1230 corresponding to the selected preview item 1210 is displayed by selecting the preview item 1210 of the preview items. For example, the preview item in FIGS. 12(a) to 12(c) may correspond to an image in which one area including the message corresponding to the preview item is illustrated in a small size. In another example, as illustrated in FIG. 12(c), a preview item 1220 is selected, and one area including a message 1240 corresponding to the selected preview item 1220 is displayed.

Animation effects may be used for operations in which a user selects a preview item so that messages displayed on the display unit 130 are changed. For example, when a preview item is selected, previously displayed messages disappear by a scrolling in any direction so that an area including messages corresponding to the preview item may appear. In this case, the respective messages or the preview item may be processed into one object and scrolled with mutually different physical characteristics, for example, different acceleration and resilience. The messages may also be replaced as if pages of a book are flipped. Previously displayed messages may fade out and one area including messages corresponding to a preview item may fade in.

FIGS. 13(a), 13(b), 13(c), and 13(d) illustrate methods of displaying a message group in an unfolded state when title information of the message group includes an image or a video according to an embodiment of the present disclosure.

Figure 13A:
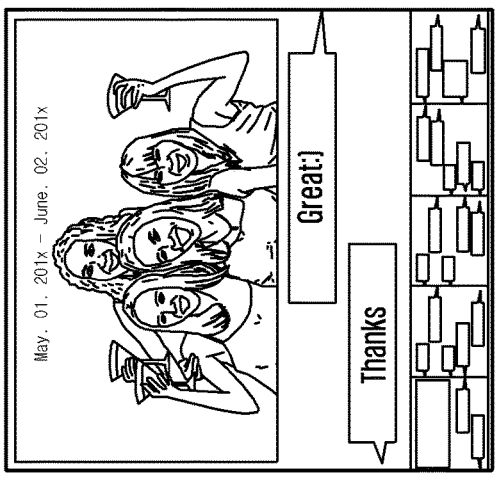
Figure 14:
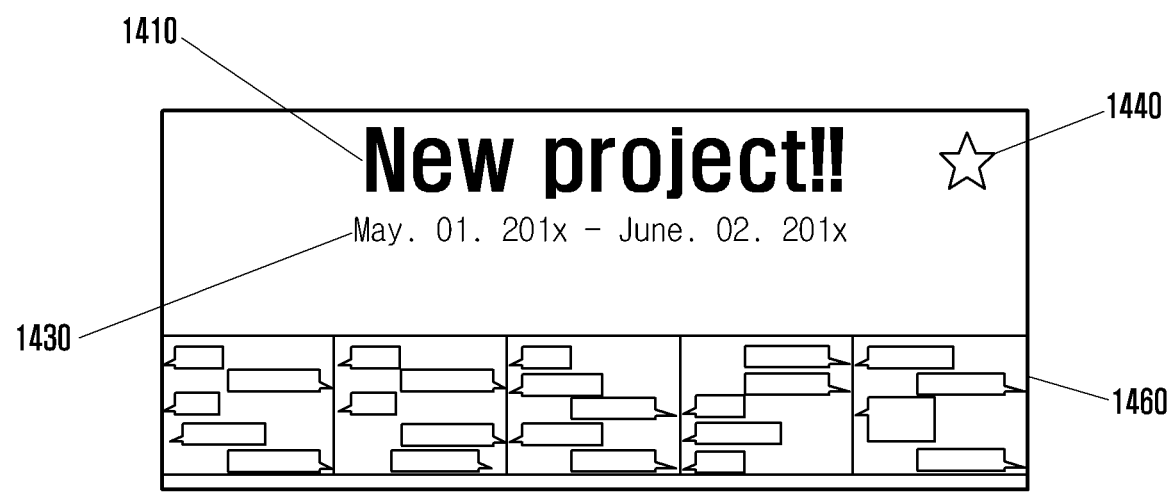
FIG. 14 illustrates a message group in a folded state according to an embodiment of the present disclosure.

Referring to FIG. 13(a) an example of displaying a message group illustrates a case where a message used as title information of the message group also includes an image. In a case where the message group is configured to have a predetermined size, the message used as the title information of the message group may occupy such that a space for displaying other messages included in the message group is decreased. For example, title information of a message group may be used for easily searching for the message group and, when a message used as the title information of the message group includes an image or a video, the message may also be used for searching for the message group even though the included image or video may be used as a background of the message group.

Referring to FIG. 13(b), an example illustrates that the image included in the title information of the message group is used as a background of messages included in the message group. Although the messages included in the message group are displayed in preference to the image used as the background in FIG. 13(b), the present disclosure is not limited thereto.

In the case where the image or video included in the title information of the message group is used as the background of the messages included in the message group, transparency of the messages included in the message group may be adjusted. Referring to FIG. 13(c), an example illustrates that the image or video used as the background is partially transparently displayed by adjusting the transparency of the messages included in the message group. For example, a size of the message used as the title information of the message group may be adjusted by a user input. Referring to FIG. 13(d), an example illustrates that the title information of the message group is adjusted to be displayed in a small size. In this case, transparency of the title information of the message group may be adjusted by a user input so that an overlapping portion between the title information of the message group, message transmission/reception times, and an identifier may be more clearly viewed. In another example, the message used as the title information of the message group may not be displayed on the display unit 130 according to a user input.

Although the case in which the message used as the title information of the message group includes the image or the video is illustrated in FIGS. 13(a), 13(b), 13(c), and 13(d), the above-described methods may also be applied to a case in which the message used as the title information of the message group includes a text message.

FIG. 14 illustrates a message group in a folded state according to an embodiment of the present disclosure.

Referring to FIG. 14, the message group in the folding state may include title information 1410 of the message group, message transmission/reception times 1430, an identifier for displaying information on the message group, and preview items 1460. Comparing FIG. 10 with FIG. 14, it can be seen that there is a difference in displaying messages which are not used as the title information. Displaying the message group in the folded state is not limited to the form illustrated in FIG. 14. Only some of the items illustrated in FIG. 14 or only the message may be displayed and items which are not illustrated in FIG. 14 may also be displayed.

In a case of displaying a plurality of messages or message groups, if a message group is displayed in the folded state, a large amount of messages or message groups may be displayed on a display unit 130 as compared with the unfolded state. For example, when a message group and messages which are not included in the message group cannot be displayed together on the display unit 130, a scroll function may be used.

FIG. 15 illustrates an operation of displaying one area in accordance with a selection of a preview item in a folded state according to an embodiment of the present disclosure.

A message group in the folded state does not have a space therein for displaying messages. In order to display messages corresponding to a preview item in the folded state, an area external to the message group may be used. In one embodiment, if the preview item is selected, an area corresponding to the preview item may be displayed through a popup window. In this case, one area corresponding to the preview item may be displayed while the preview item is selected and the popup window may be configured to be displayed for a predetermined period of time or until a new input is entered after a selection input for the preview item is detected. The popup window may be displayed on a left, right, upper, or lower side of the preview item in view of a location of the preview item on the display unit. Referring to FIG. 15, the popup window is displayed on the upper side of the preview item. In a case where there is an available space, where the popup window is to be displayed, on upper and lower sides of a message group, the popup window may be configured to be preferentially displayed on the upper side of the message group.

The unfolded and folded states may be toggled by a preconfigured condition or a user input. A plurality of message groups displayed on the display unit may be configured to be in the unfolded or folded state and all preview items may be configured to be in the unfolded or folded state. The unfolded and folded states may be configured to be switched to each other by methods such as a press of a separate button, a pinch zoom, double taps, a single tap, a multi-touch, a gesture, and the like.

FIGS. 16(a), 16(b), and 16(c) illustrate a display unit for displaying a plurality of message groups according to an embodiment of the present disclosure.

Referring to FIG. 16(a), the display unit displays a message group 1610 in an unfolded state, message groups 1620 and 1640 in a folded state, and messages 1630 and 1650 that are not included in the message groups. In FIG. 16(a), some of the message groups are in the folded state and others are in the unfolded state. However, a user may configure the user device such that all preview items are in the folded or unfolded state. For example, the display unit 130 may be implemented to display some of the message groups and the messages. Referring to FIGS. 16(b) and 16(c), the illustrated examples show that some of the message groups and the messages of FIG. 16(a) are displayed. When one point on a screen illustrated in FIG. 16(b) is touched by a user input and the touch is then dragged, a screen illustrated in FIG. 16(c) may be displayed. In this case, the user input for a screen scroll may also be a voice input or a motion input other than the touch input.

When the message groups are displayed on the display unit 130, at least one of the message groups may be shifted, one message group may be divided into two message groups, two message groups may be integrated into one message group, or at least one of the message groups may be deleted. Furthermore, a new message may be added to the message groups or messages included in the message groups may be deleted or shifted. Such an editing function for the message groups or the messages may be implemented to be performed in an editing mode, and may be performed by methods illustrated in FIGS. 17 to 22.

Figure 17C:
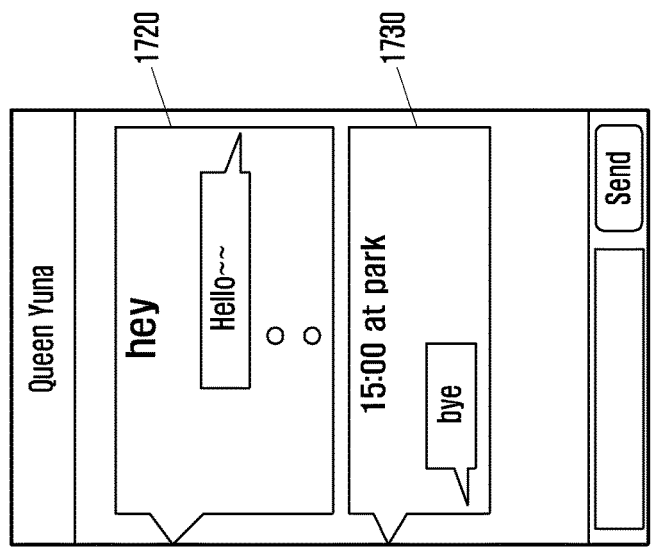
FIG. 17 illustrates an operation of dividing a message group according to an embodiment of the present disclosure.
Figure 17B:
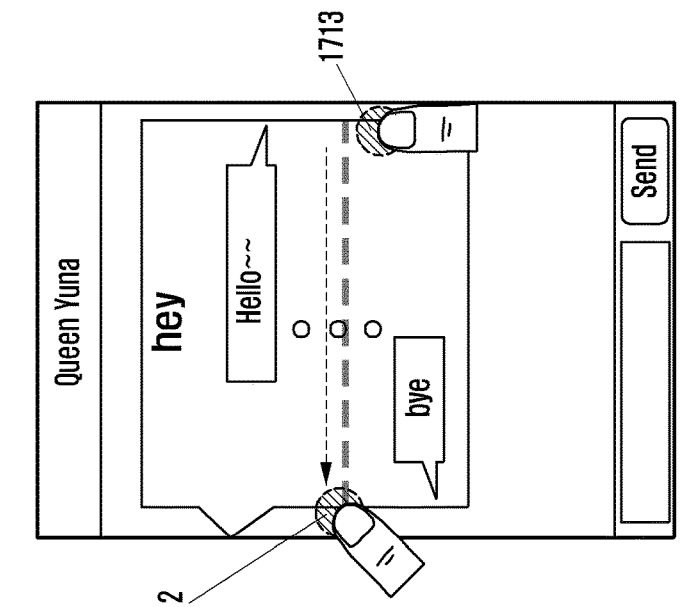
Figure 17A:
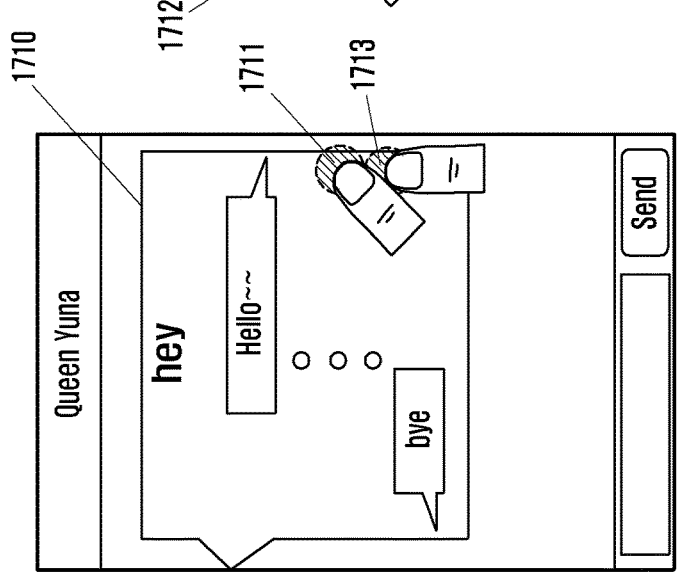

FIGS. 17(a), 17(b), and 17(c) illustrate an operation of dividing a message group according to an embodiment of the present disclosure.

Referring to FIG. 17(a), a drag starts from a point 1711 at one side of a message group 1710. Referring to FIG. 17(b), the drag ends at a point 1712 at an opposite side of a message group 1710. While the drag is being made as illustrated in FIGS. 17(a) and 17(b), a touch on a point 1713 at the right side of the message group 1710 is maintained. As illustrated in FIG. 17(c), one message group 1710 is divided into two message groups 1720 and 1730 based on a straight line connecting the point 1711 and the point 1712, which serves as a boundary line. The boundary line by which the message group is divided may correspond to a space between messages and may also correspond to a space between lines within one message. An input for requesting division of a message group is not limited to the above-described input, and for example, even in a case where a touch is maintained at a point where a drag ends, the message group may be divided. The drag that starts from one point at one side of the message group and ends at the other point at the opposite side of the message group is intuitive and may be easily distinguished from other inputs. When the message group is divided according to the input, an animation effect may be concurrently displayed. For example, when the message group is divided, an animation effect of cutting a piece of paper with scissors or tearing a piece of paper with a hand may be displayed on a screen.

FIGS. 18(a), 18(b), 18(c), 18(d), and 18(e) illustrate an operation of combining message groups according to an embodiment of the present disclosure.

The operation of combining the message groups may include an operation of determining a main message group. When the combination of the message groups is completed, title information of the main message group is displayed as title information of a message group obtained by the combination. In order to integrate two or more message groups into one message group, an input for activating a message group combining function should be detected. The input for activating the message group combining function may include a long press for a message group or a selection of a button used only for activation, but is not limited thereto. For example, the long press for the message group may correspond to an input for a change to the editing mode and the message group combining function and a function for excluding a message from a message group may be activated together by the long press in the editing mode.

Referring to FIG. 18(a), a message group combining function is activated by a long press for a main message group 1810. Referring to FIG. 18(b), another message group 1820 to be combined is touched and thereby selected. As illustrated in FIG. 18(c), the message group 1820 selected by the touch is combined to the main message group 1810. Although title information of the main message group is displayed for title information of the message group obtained by the combination of the messages, the present disclosure is not limited thereto. In a case where a plurality of message groups are combined to the main message group, the message groups may be combined to the main message group in an order of a touch thereon. Referring to FIGS. 18(d) and 18(e), an operation combining a new message group 1830 by touching the message group is illustrated. For example, when an input other than the touch on the message groups is entered, the message group combining function may be deactivated. In contrast, when the message groups are combined to each other, the message group combining function may also be automatically deactivated.

In another example, in a case where a touch input on a message but not a message group is detected while the message group combining function is activated, the touched message may be allowed to be included in the message group.

Figure 19C:
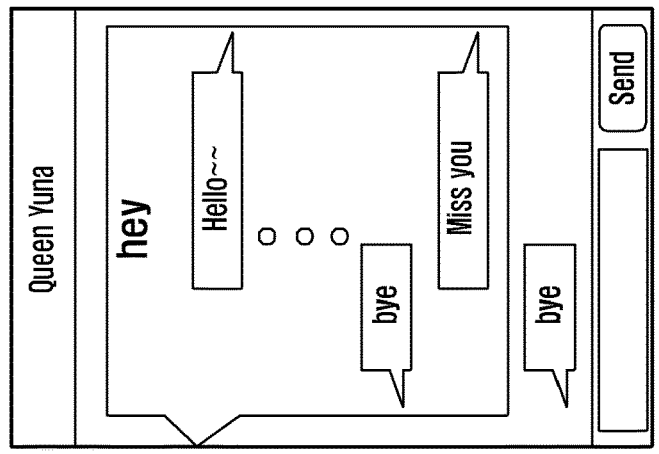
FIG. 19 illustrates an operation of including a message in a message group according to an embodiment of the present disclosure.
Figure 19B:
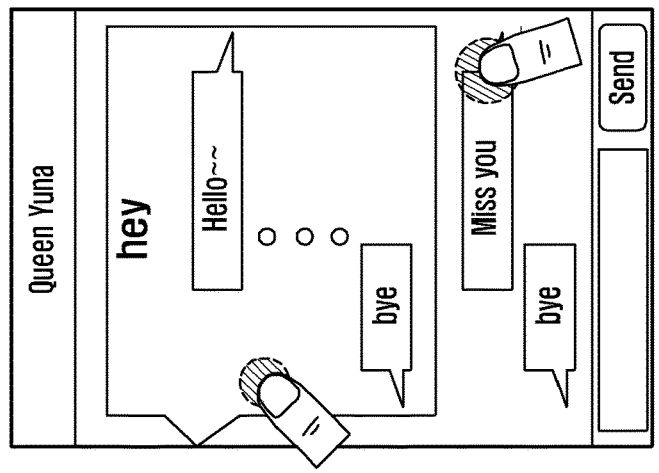
Figure 19A:
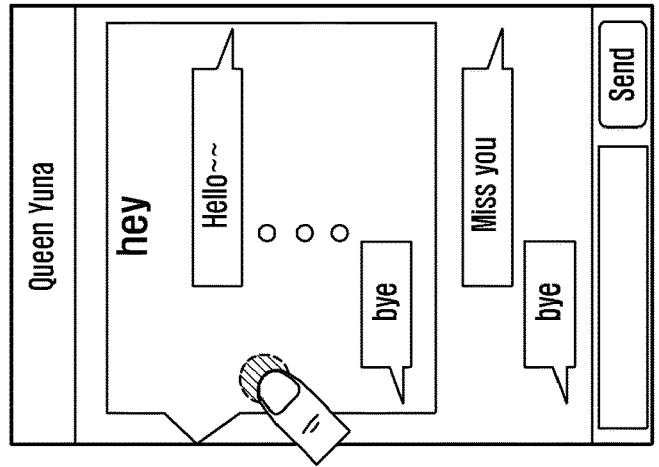

FIGS. 19(a), 19(b), and 19(c) illustrate an operation of including a message in a message group according to an embodiment of the present disclosure.

Referring to FIG. 19(a), a message group combining function is activated and a reference message group is determined by a long press. An input for activating the message group combining function is not limited to the long press. Referring to FIG. 19(b), a message that does not belong to the message group is touched. Referring to FIG. 19(c), the touched message is displayed while being included in the message group. Through such a method, a message may be added to an existing message group.

Figure 20C:
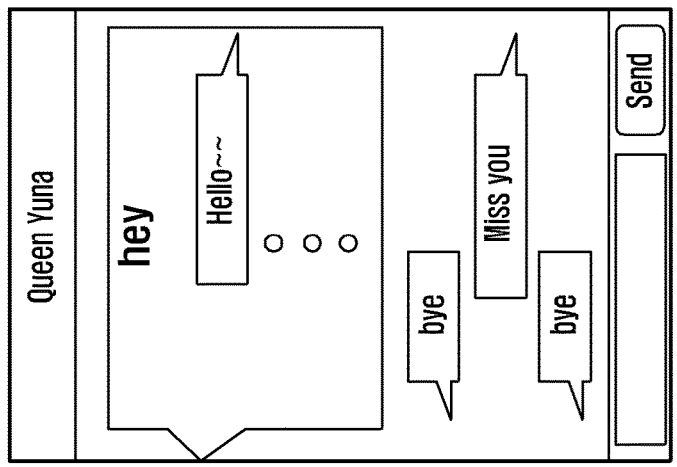
FIG. 20 illustrates an operation of excluding a message from a message group according to an embodiment of the present disclosure.
Figure 20B:
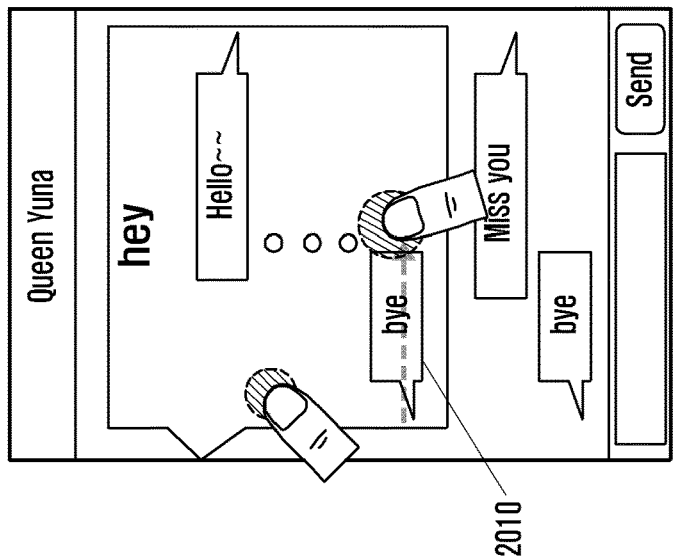
Figure 20A:
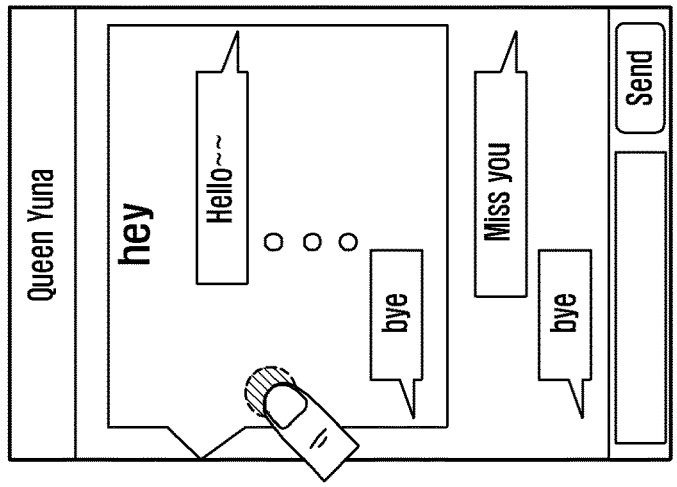

FIGS. 20(a), 20(b), and 20(c) illustrate an operation of excluding a message from a message group according to an embodiment of the present disclosure.

Referring to FIG. 20(a), a long press is made for a message group so as to activate a function for excluding a message from the message group. An input for activating the function for excluding the message from the message group is not limited to the long press. Referring to FIG. 20(b), while the long press for the message group is maintained, a message 2010 to be excluded from the message group is dragged. When the drag is completed, the dragged message is displayed and excluded from the message group to which the dragged message previously belonged, as illustrated in FIG. 20(c). Although the drag ends within the message group in FIG. 20(b), the present disclosure is not limited thereto.

FIG. 21 illustrates an operation of moving a message group according to an embodiment of the present disclosure.

Figure 21A:
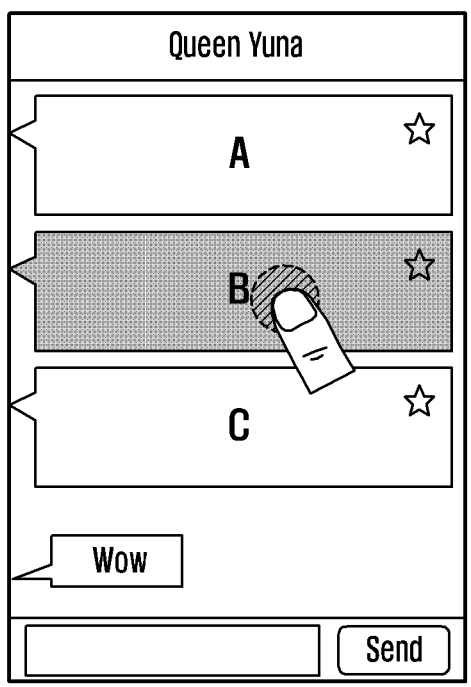
FIG. 21 illustrates an operation of moving a message group according to an embodiment of the present disclosure.

Referring to FIG. 21(a), a message group to be moved is selected in an editing mode.

Figure 21B:
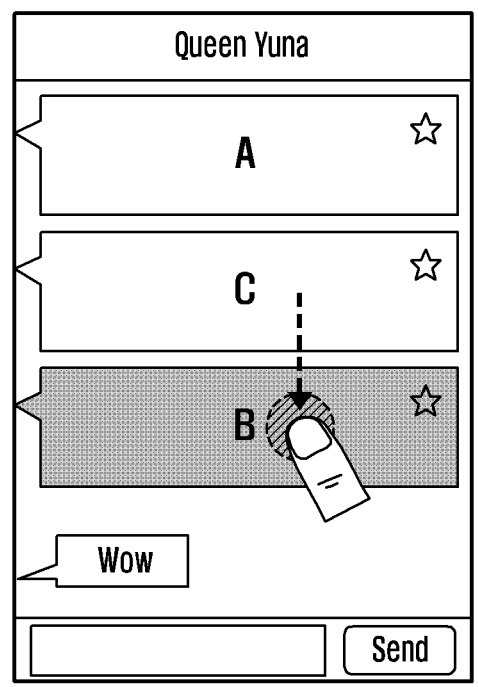

At this time, a message group selection input for the movement of the message group may include an operation of touching a specific location of the message group or an operation of touching a margin portion where there is no message. For example, when the specific location of the message group to be moved is touched or the margin portion where there is no message is touched for a predetermined period of time or more as illustrated in FIG. 21(a), an option menu is displayed. The option menu includes a location change button of another message group and the message group is dragged and moved while the location change button is selected. This is one example embodiment and the method of moving the message group is not limited thereto. Referring to FIG. 21(b), the selected message group is dragged and moved on a display unit 130 of a user device.

Figure 22:
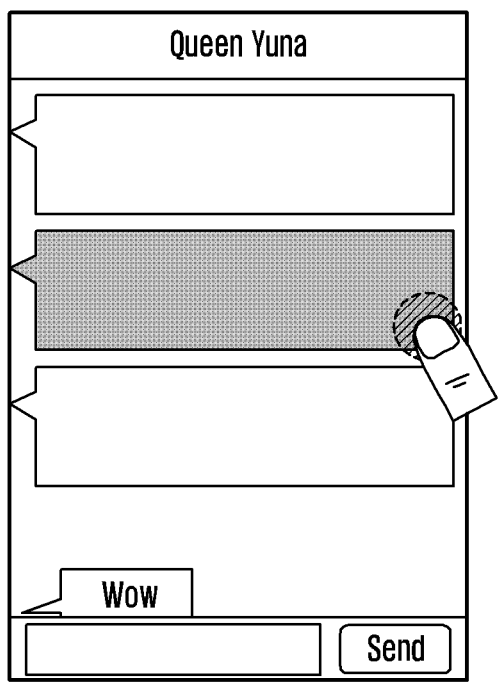
FIG. 22 illustrates an operation of deleting a message group according to an embodiment of the present disclosure.

FIG. 22 illustrates an operation of deleting a message group according to an embodiment of the present disclosure.

A user of a user device may delete a message group by an input for deleting the message group in an editing mode. Referring to FIG. 22, the message group is deleted by a touch on a specific location of the message group. The input for deleting the message group is not limited thereto, and may include at least one of a selection of a specific button, a single touch, and a multi-touch.

When a plurality of message groups are displayed on a display unit 130, an arrangement order of the message groups may be determined based on temporal precedence relationships between messages included in the message groups. For example, the arrangement order of the message groups may be determined based on temporal precedence relationships between the first transmitted or received message among messages included in the respective message groups, the latest transmitted or received message among the messages included in the respective message groups, and representative messages of the respective message groups.

Figure 23A:
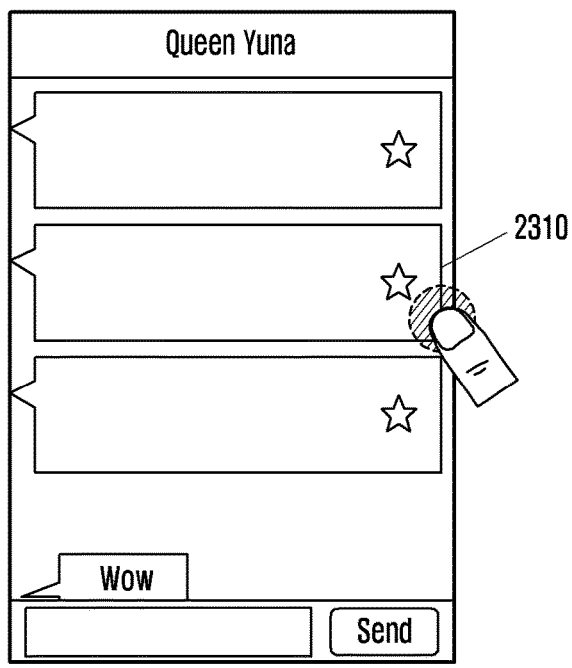
FIG. 23 illustrates an operation of changing an arrangement order of message groups according to an importance value of the message groups according to an embodiment of the present disclosure.
Figure 23B:
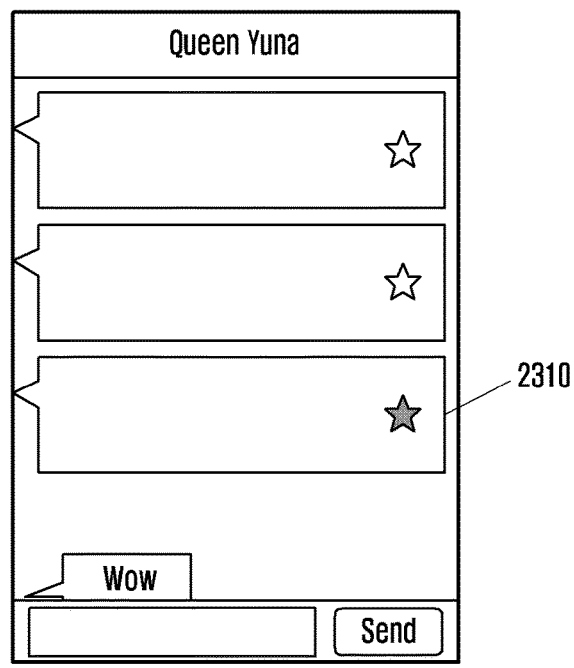

FIGS. 23(*a*) and 23(*b*) illustrate an operation of changing an arrangement order of message groups according to an importance value of the message groups according to an embodiment of the present disclosure.

When a user configures importance values for respective message groups, an arrangement order of a plurality of displayed message groups may be determined in view of the importance values. For example, message groups may be sequentially displayed such that a message group having a higher importance value is located at a lower end of a screen. Between messages having an identical importance value, an arrangement order may be determined based on temporal precedence relationships between the latest transmitted or received messages among messages included in the respective message groups. For example, message groups may be sequentially displayed such that a message group having a higher screen access frequency (e.g., higher than an average access frequency) but not a higher importance value is located at a lower end of a screen.

Referring to FIG. 23(*a*), a user of a user device touches an identifier for an importance value of a message group 2310 to change the importance value. Referring to FIG. 23(*b*), the message group 2310 having an importance value increased by the touch is displayed below another message group having a lower importance value.

When a user input is made in response to a request for displaying a message input area or an input is made for a change to an input mode, the message input area may be displayed on a display unit 130. When an input unit 120 detects a third drag input from a third message to the message input area while the message input area is displayed, a controller 150 may configure such that a message auto-inclusion function is activated. For example, the third drag input may include an operation of selecting the third message from messages included in a message group displayed on the display unit 130 and dragging the third message to the message input area. When the message auto-inclusion function is activated according to the third drag input, the controller 150 may control the display unit 130 to display a connection relation between the message input area and the message group. Furthermore, a message that the user inputs and transmits while the message auto-inclusion function is activated may be configured to be automatically included in the corresponding message group including the third message. For example, when the input unit 120 detects an input for a new message while the message auto-inclusion function is activated, the controller 150 may control the display unit 130 to display a message group including the detected new message. For example, a message newly received while the message auto-inclusion function is activated may be implemented to be automatically included in the corresponding message group including the third message. In another example, when a communication unit 110 receives a new message while the message auto-inclusion function is activated, the controller 150 may control the display unit 130 to display a message group including the received message.

The message auto-inclusion function may be deactivated according to a pre-configured condition or a user input. Here, the preconfigured condition may include the ending of a message based conversation function or a change to the reading mode. The user input may include a selection of a specific button or a drag that starts from the message input area and ends in an area within the message group including the third message.

It has been described that the message auto-inclusion function is activated by selecting any one of the messages included in the message group and dragging the selected message to the message input area. An input for activating the message auto-inclusion function is not limited thereto and, for example, the message auto-inclusion function may also be simultaneously activated together with creation of a message group.

Figure 24A:
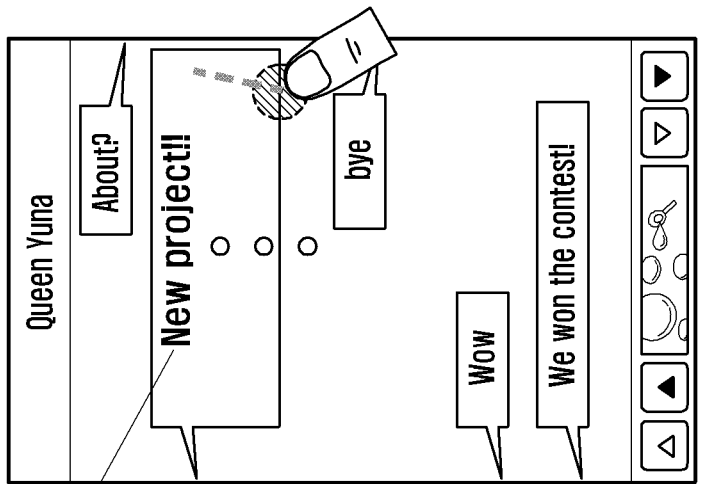
FIG. 24 illustrates an operation of simultaneously activating a message auto-inclusion function when a message group is created according to an embodiment of the present disclosure.
Figure 24B:
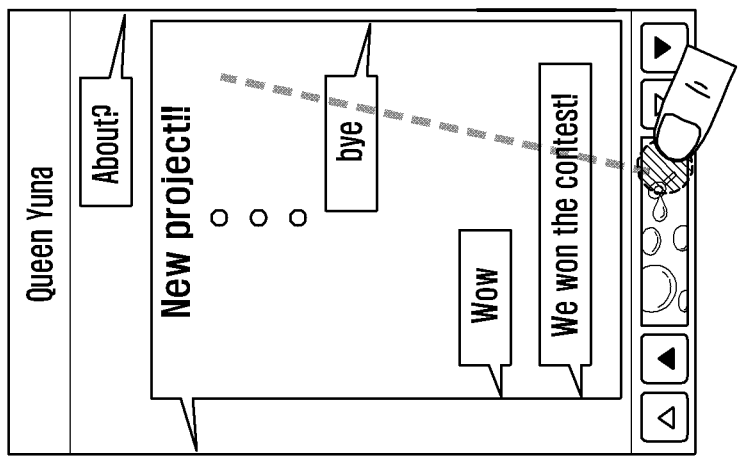
Figure 24C:
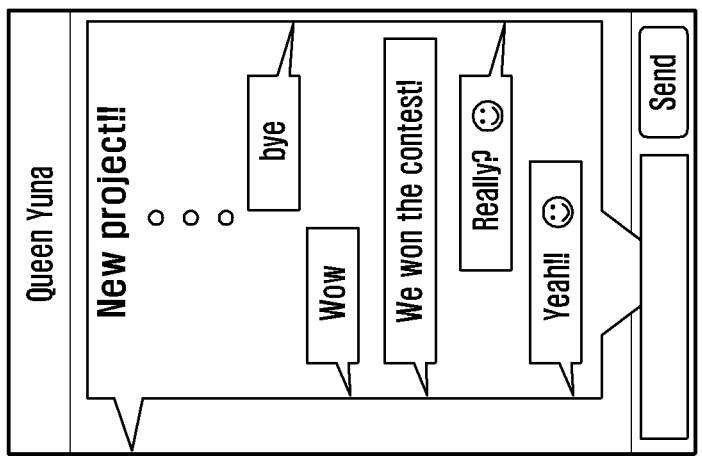

FIGS. 24(*a*), 24(*b*), and 24(*c*) illustrate an operation of simultaneously activating a message auto-inclusion function when a message group is created according to an embodiment of the present disclosure.

A third drag input for activating a message auto-inclusion function may replace a first drag input. Referring to FIG. 24(*a*), a drag starts from a message 2410 in order to create a message group. Referring to FIG. 24(*b*), the drag ends in a message input area, which is different from the first user input of FIGS. 3(*a*) to 3(*e*) which ends at the position where the message exists. The drag which starts from the message 2410 and ends in the message input area may be configured as the third drag input. For example, in FIGS. 24(*a*) and 24(*b*), the message 2410 may correspond to the third message and the drag may correspond to the third drag input. As illustrated in FIG. 24(*c*), a message group including messages corresponding to the drag may be created according to the third drag input and may be displayed illustrating that there is a connection passage between the created message group and the message input area. Although the funnel-shaped connection passage is illustrated in FIG. 24(*c*), the shape of the connection passage is not limited thereto. When the message auto-inclusion function is activated, a new message input by a user is displayed while being automatically included in the corresponding message group. For example, when the message auto-inclusion function is activated, a message received from a third-party may also be configured to be automatically included in the message group. In another example, a button or menu for activating the message auto-inclusion function may be separately provided, and the corresponding function may be activated by selecting the button or menu.

Figure 25:
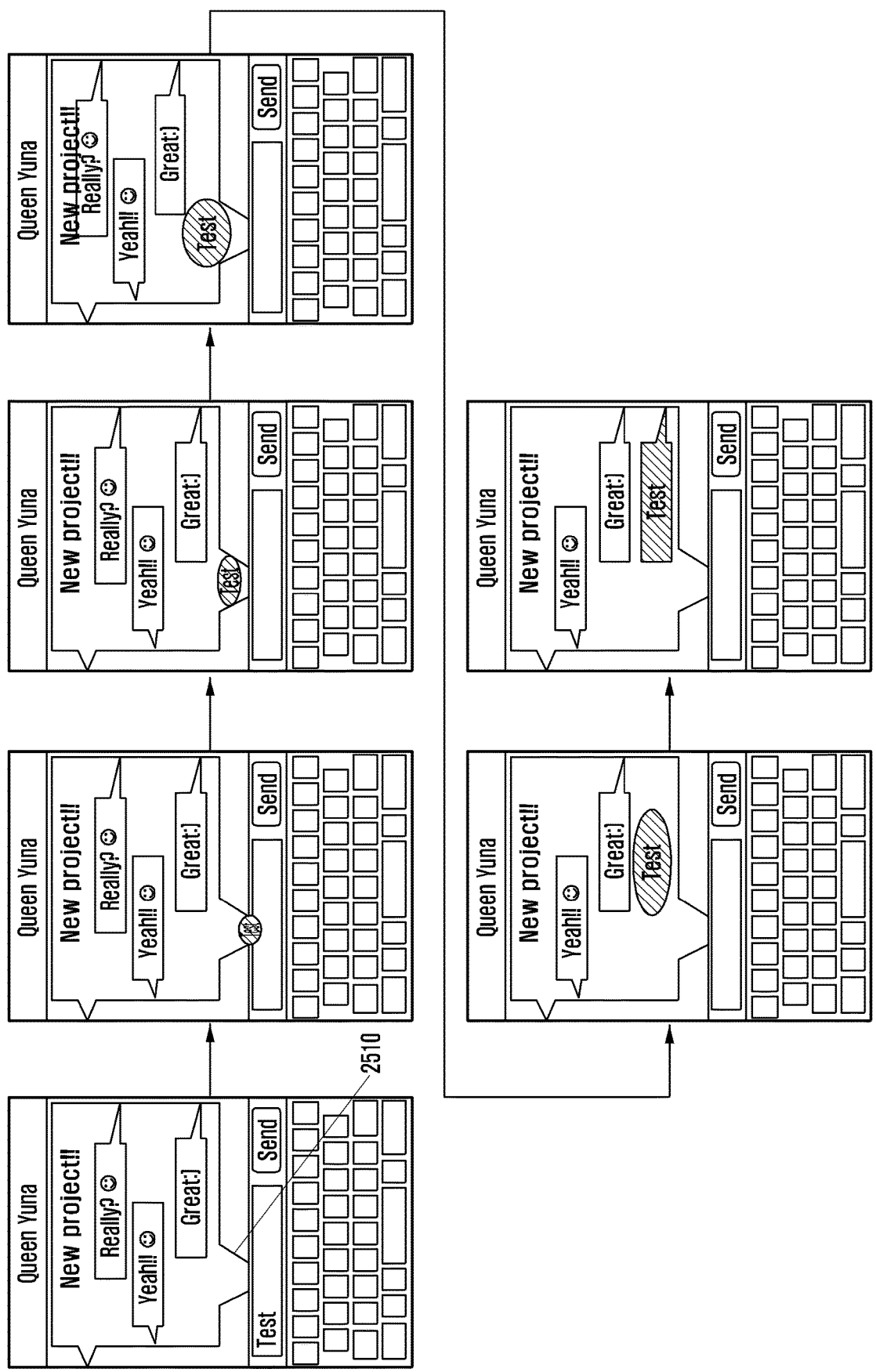
FIG. 25 illustrates animation effects in a case where a message auto-inclusion function is activated according to an embodiment of the present disclosure.

FIG. 25 illustrates animation effects in a case where a message auto-inclusion function is activated according to an embodiment of the present disclosure.

An operation in which a newly created message is automatically included in a message group may include animation effects. Referring to FIG. 25, a funnel-shaped connection passage 2510 is illustrated between a message group and a message input area. This represents a graphic interface similar to an apparatus for creating a bubble and the present disclosure is not limited thereto. Referring to FIG. 25, a new message that is input and transmitted by a user that moves through the connection passage 2510 while being enclosed by an oval to be included in the message group. For example, if a user touches the moving bubble, the operation in which the corresponding message is included in the message group may be cancelled while an animation effect of bursting the bubble is displayed. The cancellation of the operation in which the corresponding message is included in the message group may also cancel the message transmission. In contrast, only the operation in which the corresponding message is included in the message group may be cancelled and the message itself may be transmitted.

Figure 26A:
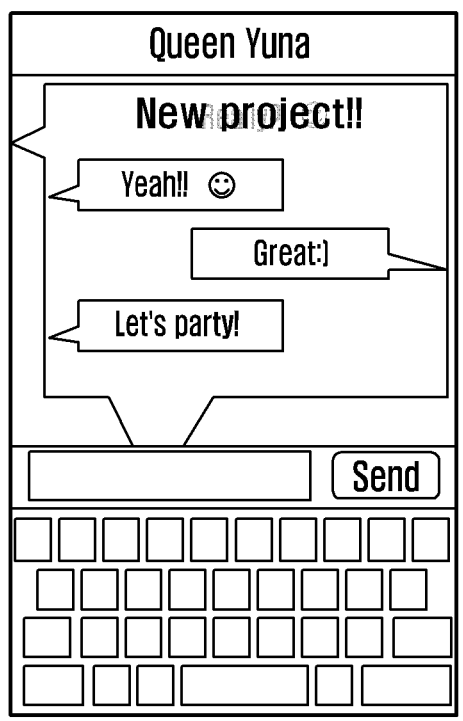
FIG. 26 illustrates an operation of displaying a message group while a message auto-inclusion function is activated according to an embodiment of the present disclosure.
Figure 26B:
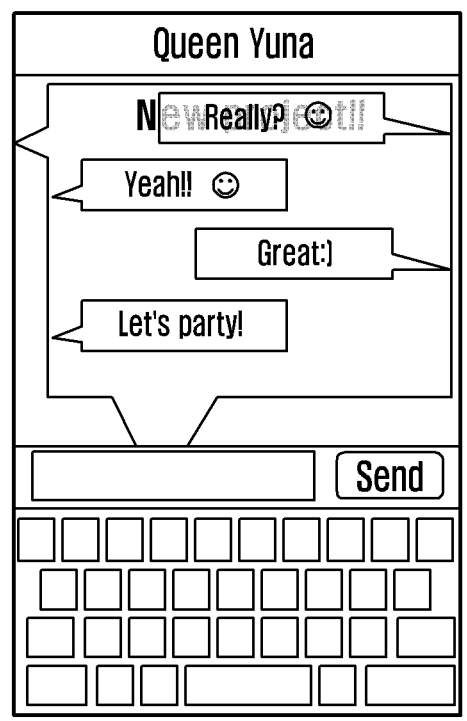

FIGS. 26(a) and 26(b) illustrate an operation of displaying a message group while a message auto-inclusion function is activated according to an embodiment of the present disclosure.

While the message auto-inclusion function is activated, title information of a message group and messages included in the message group may be displayed together by adjusting transparency of the title information or the messages. Referring to FIGS. 26(a) and 26(b), the title information of the message group and the messages included in the message group are displayed together by adjusting transparency of the messages and the title information.

Figure 27:
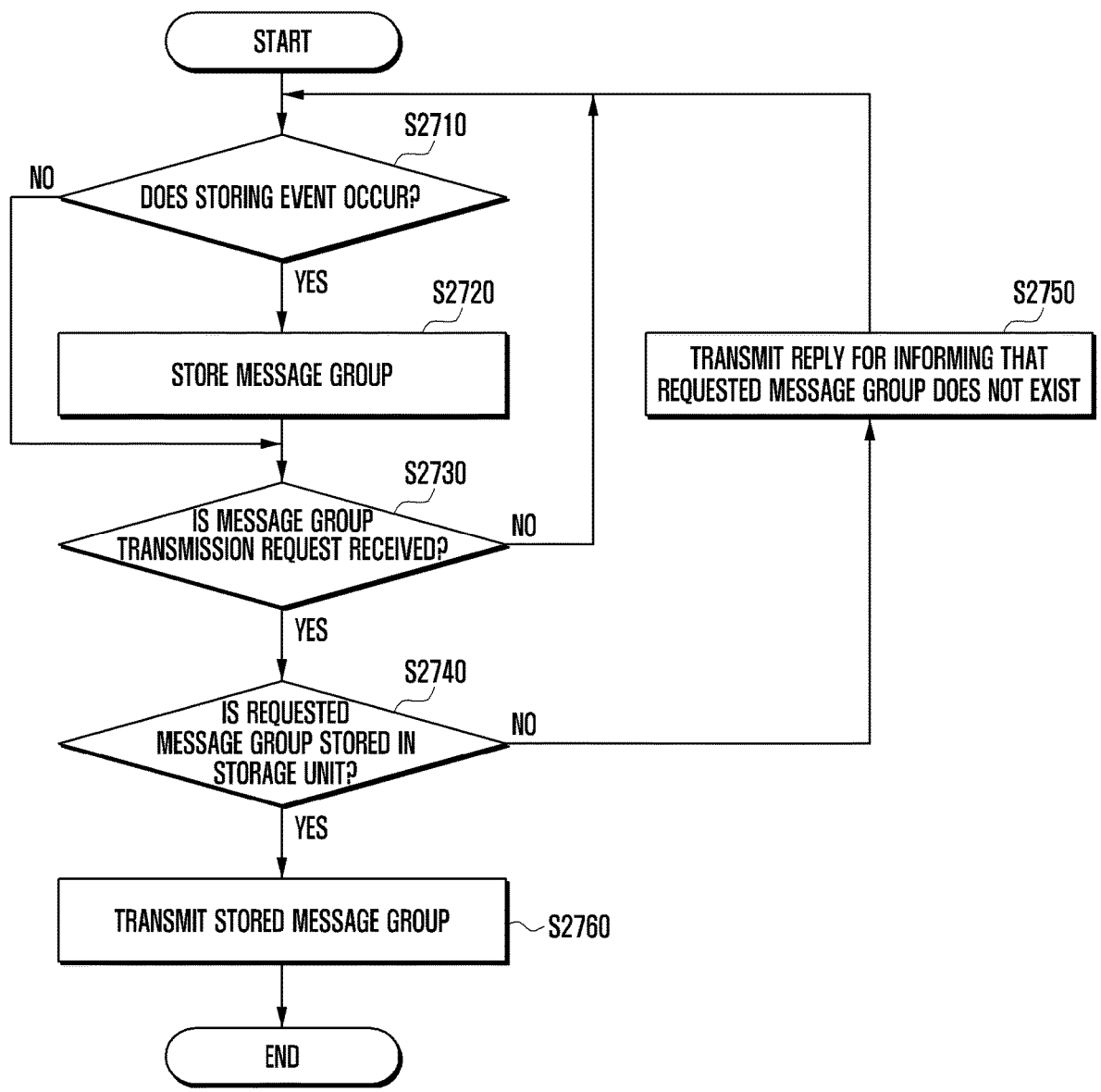
FIG. 27 is a flowchart illustrating operations of storing and transmitting a message group during an operation of a conversation function according to an embodiment of the present disclosure.

FIG. 27 is a flowchart illustrating operations of storing and transmitting a message group during an operation of a conversation function according to an embodiment of the present disclosure.

A controller 150 may determine whether an event for storing a message group occurs at operation S2710. The event for storing the message group may occur periodically or by a user input. When the event for storing the message group occurs, the controller 150 may store the messages included in the message group are stored as one message group in the storage unit 140 at operation S2720.

When it is determined that the event for storing the message group has not occurred, or after the message group is stored in the storage unit 140, the controller 150 may determine whether a message group transmission request is received at operation S2730. The message group transmission request may be input through an input unit 120 or may be received from another user device through a communication unit 110. When the message group transmission request is received, the controller 150 may determine which of message groups stored in the storage unit 140 is requested to be transmitted at operation S2740. In a case where the message group requested to be transmitted is not stored in the storage unit 140, the controller may transmit a reply informing the user device that transmitted the message group transmission request that the requested message group does not exist at operation S2750. In a case where the message group requested to be transmitted is stored in the storage unit 140, the controller may transmit the corresponding message group stored in the storage unit 140 through the communication unit 110 at operation S2760.

Figure 28B:
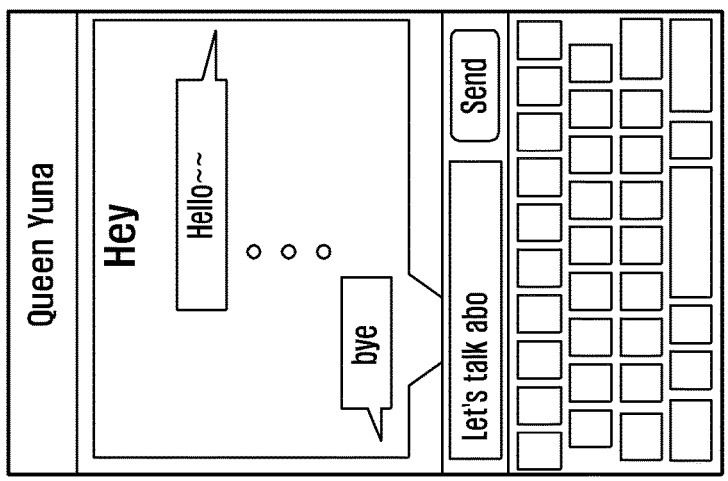
FIG. 28 illustrates a screen for storing and transmitting a message group according to an embodiment of the present disclosure.
Figure 28C:
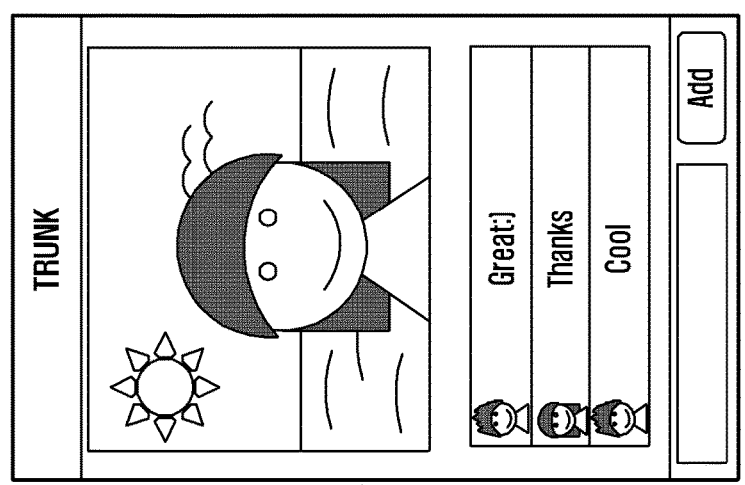
Figure 28A:
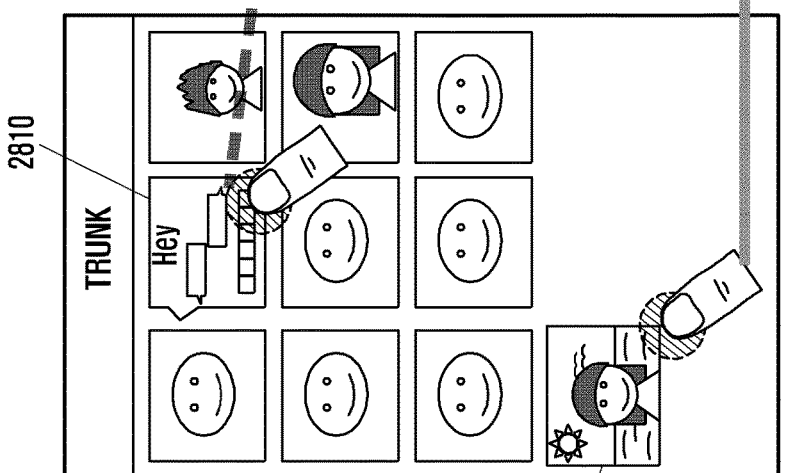

FIGS. 28(a), 28(b), and 28(c) illustrate a screen for storing and transmitting a message group according to an embodiment of the present disclosure.

When a storing event for a message group occurs, messages included in the message group may be stored as one message group in a storage unit 140. If the message group or the messages included in the message group were previously edited by a user, an editing history may be stored together in the storage unit 140.

Referring to FIG. 28(a), preview items of stored message groups is illustrated. The preview items of the message groups illustrated in FIG. 28(a) correspond to message groups stored in the storage unit 140 in contrast to preview items corresponding to messages included in a message group or preview items corresponding to message groups included in another message group. When title information includes a text, a preview screen of the text may be displayed in a preview item. When title information includes an image or a video, a preview screen of the image or video may be displayed in a preview item. Referring to FIG. 28(a), in a case of a preview item 2810, title information of a message group is text, and in a case of preview item 2820, title information of a message group is an image.

Contents of a message group may be read by an input for loading the stored message group. The input for loading the stored message group may include an operation of touching any one of the plurality of preview items displayed on a display unit 130 as illustrated in FIG. 28(a). The message group may be displayed in an input mode by the input for loading the stored message group. In this case, as illustrated in FIG. 28(b), a newly transmitted or received message may be displayed while being automatically included the message group. In another example, in a case of reading a message group of which title information is an image, messages may be displayed in a comment form for the title information on the display unit 130 as illustrated in FIG. 28(c). In the case of displaying the messages in the comment form for the title information, reading or revising the message group can be performed.

When a request for transmitting the stored message group is received, the stored message group may be transmitted to other user devices. If a preview item is touched for a predetermined time interval or more as illustrated in FIG. 28(a), an option menu is displayed. The option menu may include a send button and the message group may be transmitted to other user devices by selecting the sending button. This is one example embodiment of the present disclosure and the method of transmitting the stored message group to other user devices is not limited thereto.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of providing a message group, the method comprising:
    displaying a first region comprising a plurality of messages in a conversation screen on a display;
    detecting a user input in relation to at least two messages of the plurality of messages displayed in the conversation screen; and
    displaying and generating, when the user input is an input for generating a message group, the message group including at least two messages on the first region;
    wherein the displaying the conversation screen further comprises:
        in response to detecting a second user input for displaying a preview item, providing a second region presenting a plurality of preview items corresponding to the message group at a part of the conversation screen by reducing the first region comprising the plurality of messages; and
        when one of the plurality of preview items is selected in the second region, displaying a pop-up window including the messages of the message group corresponding to selected the preview item.

2. The method of claim 1, further comprising:
    distinguishing the user input into a first user input and a second user input based on information of the user input, the information of the user input comprising at least one of an input strength, an input direction, an input intensity, an input location, a number of inputs, an input type, an input speed, an input distance, an input indicating hovering, or an indication of an input source.

3. The method of claim 1, wherein the displaying and generating of the message group comprises:
displaying the generated message group by emphasizing the at least two messages in relation to the user input if the user input is the second user input.

4. The method of claim 3, wherein the displaying and generating of the message group comprises:
determining at least one of a number of messages displayed in each message group or a size by which the message group is displayed, based on at least one of a preconfigured condition and a user input.

5. The method of claim 1, further comprising:
receiving a user input for inputting a new message; and
including the new message in the message group if the new message is acquired.

6. The method of claim 1, further comprising:
transmitting the message group to other user devices when a request for transmitting the message group is received.

7. A user device having a message providing function, the user device comprising:
a display configured to display at least one message;
an input device configured to detect a user input in relation to the at least one message; and
a processor configured to:
display a first region comprising a plurality of messages in a conversation screen on the display,
generate, when the user input is an input for generating a message group, the message group including at least two messages on the first region in relation to the user input detected by the input device;
provide, in response to detecting a second user input for displaying a preview item, a second region presenting a plurality of preview items corresponding to the message group at a part of the conversation screen by reducing the first region comprising the plurality of messages, and
display, when one of the plurality of preview items is selected in the second region, a pop-up window including the messages of the message group corresponding to the selected the preview item.

8. The user device of claim 7, wherein the processor is further configured to:
distinguish the user input into a first user input and a second user input based on information of the user input,
generate the message group in a case where the user input is the first user input, and
display by emphasizing the at least two messages in relation to the user input in a case where the user input is the second user input.

9. The user device of claim 7, wherein the processor is further configured to:
include a new message in the first message group if the new message is acquired.

10. The user device of claim 9, further comprising:
a transceiver configured to transmit and receive at least one message, wherein the processor is further configured to transmit the message group to other user devices through the transceiver when a request for transmitting the message group is received.

11. A non-transitory computer readable recording medium storing a program, the program when executed configuring at least one computer processor to:
display a first region comprising a plurality of messages in a conversation screen on a display;
detect a user input in relation to at least two messages of the plurality of messages displayed in the conversation screen;
display and generate, when the user input is an input for generating a message group, the message group including at least two messages on the first region;
in response to detecting a second user input for displaying a preview item, provide a second region presenting a plurality of preview items corresponding to the message group at a part of the conversation screen by reducing the first region comprising the plurality of messages; and
when one of the plurality of preview items is selected in the second region, display a pop-up window including the messages of the message group corresponding to the selected the preview item.

* * * * *